(12) United States Patent
Hayata

(10) Patent No.: US 8,932,687 B2
(45) Date of Patent: *Jan. 13, 2015

(54) PROCESS FOR PRODUCING MOLDED PRINTED MATERIAL, AND MOLDED PRINTED MATERIAL

(75) Inventor: Yuuichi Hayata, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 1324 days.

This patent is subject to a terminal disclaimer.

(21) Appl. No.: 11/861,100

(22) Filed: Sep. 25, 2007

(65) Prior Publication Data

US 2008/0075884 A1 Mar. 27, 2008

(30) Foreign Application Priority Data

Sep. 25, 2006 (JP) ................................. 2006-258355

(51) Int. Cl.
| | |
|---|---|
| B29C 71/02 | (2006.01) |
| B41J 2/01 | (2006.01) |
| C08F 2/46 | (2006.01) |
| C08J 3/28 | (2006.01) |
| C08K 5/00 | (2006.01) |
| C08K 3/00 | (2006.01) |
| B41J 2/135 | (2006.01) |
| B29C 59/02 | (2006.01) |
| B41M 5/52 | (2006.01) |
| C09D 11/101 | (2014.01) |
| C09D 11/30 | (2014.01) |
| B41M 7/00 | (2006.01) |
| B29C 35/08 | (2006.01) |

(52) U.S. Cl.
CPC ............... B29C 59/02 (2013.01); B41M 5/52 (2013.01); C09D 11/101 (2013.01); C09D 11/30 (2013.01); B41M 7/0081 (2013.01); B41M 7/0045 (2013.01); B29C 2035/0833 (2013.01)
USPC .............. 427/542; 522/74; 522/75; 522/78; 522/84; 522/85; 347/45

(58) Field of Classification Search
CPC ..................................................... B29C 71/02
See application file for complete search history.

(56) References Cited

U.S. PATENT DOCUMENTS

| | | | | |
|---|---|---|---|---|
| 4,369,885 | A * | 1/1983 | Redmond | 206/484 |
| 7,105,270 | B2 * | 9/2006 | Fujita et al. | 430/270.1 |
| 7,553,605 | B2 * | 6/2009 | Hayata et al. | 430/286.1 |
| 2003/0083396 | A1* | 5/2003 | Ylitalo et al. | 522/74 |
| 2003/0169313 | A1* | 9/2003 | Shimomura et al. | 347/45 |
| 2004/0023159 | A1* | 2/2004 | Sakayori | 430/283.1 |
| 2004/0052968 | A1* | 3/2004 | Takabayashi | 427/511 |
| 2004/0186216 | A1* | 9/2004 | Satoh et al. | 524/502 |
| 2008/0075882 | A1* | 3/2008 | Hayata | 427/542 |
| 2008/0075883 | A1* | 3/2008 | Hayata et al. | 427/542 |
| 2008/0108747 | A1* | 5/2008 | Nakamura et al. | 524/606 |
| 2009/0074982 | A1* | 3/2009 | Nakamura et al. | 427/511 |
| 2009/0087626 | A1* | 4/2009 | Hayata et al. | 428/195.1 |
| 2009/0202795 | A1* | 8/2009 | Hayata et al. | 428/195.1 |

FOREIGN PATENT DOCUMENTS

| | | | |
|---|---|---|---|
| JP | 2003-326591 A | 11/2003 | |
| JP | 3119282 B2 | 7/2004 | |
| JP | 2004-291568 | * 10/2004 | ............... B41M 5/00 |
| WO | 02-38688 A2 | 5/2002 | |
| WO | 2005-026270 A1 | 3/2005 | |

* cited by examiner

Primary Examiner — Yun Qian
(74) Attorney, Agent, or Firm — Sughrue Mion, PLLC

(57) ABSTRACT

A process for producing a molded printed material is provided that includes (A) a step of forming an image on a support by an inkjet method using an ink composition comprising a polymerizable monomer, a colorant, and a polymerization initiator, (B) a step of forming a surface coating layer on the image by an inkjet method using a liquid composition comprising a polymerizable monomer and a polymerization initiator and comprising substantially no colorant, (C) a step of curing the image by irradiation with actinic radiation, (D) a step of curing the surface coating layer by irradiation with actinic radiation so as to obtain a printed material having the image and the surface coating layer cured on the support, and (E) a step of molding the printed material. There is also provided a molded printed material obtained by the process for producing a molded printed material.

8 Claims, 2 Drawing Sheets

PROCESS FOR PRODUCING MOLDED PRINTED MATERIAL, AND MOLDED PRINTED MATERIAL

BACKGROUND OF THE INVENTION

1. Field of the Invention

The present invention relates to a process for producing a molded printed material, and to a molded printed material.

2. Description of the Related Art

Molded printed materials such as molded printed sheets (decorative sheets) are used today in various applications. For example, the surface sheet of a membrane switch used in an electrical product, etc. is produced by forming an image on a thin plastic sheet (PET, polycarbonate, polystyrene, etc. having a film thickness of about 100 μm) and then embossing it in order to impart a click feel to a switch portion (click portion). Furthermore, there are many cases in which, in order to give a printed material a matte appearance or a three-dimensional feel in design, the printed material is subjected to embossing.

Moreover, drink product vending machines for drinking water, tea, juice, etc. are widespread, and these vending machines display dummy display items of products for sale. As such dummy display items, a flat support that is formed by subjecting a transparent thermoplastic resin sheet to decorative printing is deep drawn to give a halved shape of an actual-size drink product container, thus forming a deep-drawn molding with a rise of 25 mm or higher in some cases, and the back face is illuminated so as to give a strong appeal to the product image.

As a process for producing a deep-draw molding from such a decorative thermoplastic resin sheet, vacuum forming, pressure forming, or vacuum/pressure forming is most suitable. In principle, vacuum forming involves preheating a flat support to a temperature at which it can be thermally deformed, and pressing and cooling it against a mold while drawing it to the mold by means of reduced pressure, and pressure forming involves pressing and cooling it against a mold while applying pressure from the side opposite to the mold. Vacuum/pressure forming involves carrying out the reduction in pressure and the application of pressure at the same time.

Therefore, in embossing, vacuum forming, pressure forming, and vacuum/pressure forming (hereinafter, called 'vacuum forming, etc.'), since a thermoplastic resin sheet used as a substrate is required to have a high degree of stretchability in a heated state, a polycarbonate resin sheet, a polyester resin sheet, a cured vinyl chloride resin sheet, a polystyrene resin sheet, etc. are generally used, and from the viewpoint of ease of decorative printing and various resistance properties of a molding formed by vacuum forming, etc. being excellent, a polycarbonate resin sheet or a polyester resin sheet, and in particular a polycarbonate resin sheet, is most suitably used. As the thermoplastic resin sheet, one having a thickness of on the order of 0.1 to 0.8 mm, and preferably on the order of 0.3 to 0.6 mm, is generally used.

Furthermore, for decorating the above sheet a solvent-based ink composition containing a colorant such as a pigment as an ink and, as a binder, a vinyl chloride copolymer, a solvent-soluble polyester resin, an acrylic resin, etc. is normally used. A decorative printed layer that has been printed using such an ink is very suitably used since it exhibits good stretchability in vacuum forming, etc. by conforming to the substrate sheet in a heated state.

However, in the above-mentioned conventional method, since a solvent-based ink composition is used, there is the environmental problem that the solvent must be removed by evaporation, and there is the difficulty that thermal energy and drying time for removing the solvent by evaporation are required.

From such a viewpoint, printing a thermoplastic resin sheet using a UV-curing ink composition, which does not employ a solvent, and then processing it has been proposed (Japanese Patent No. 3119282). However, this proposal relates to cold bending, or to pressing or thermal pressing in which the rise angle is as small as on the order of 45° and the draw depth is as small as on the order of only 5 mm, and no attempt has been made to use a UV-curing colored ink composition for decorating a deep-drawn vacuum-formed product in which the sheet is drawn by a factor of several times.

Conventionally, as a printing method for obtaining a printed sheet (decorative sheet) to which molding is applied, a printing method employing a printing plate such as offset printing, screen printing, or gravure printing is used. These printing methods require an expensive printing system and preparation of a printing plate, and are not suitable for small-scale production because of the cost and effort.

On the other hand, in the inkjet method, the printing system is inexpensive, and no plate is required for printing; since an image is formed directly on a recording medium by discharging ink composition only onto a required image area, the ink composition can be used efficiently, and the running cost is low, particularly in small lot production. Moreover, the inkjet method has attracted attention in recent years since noise is low and it is excellent as an image recording method.

In particular, with regard to an inkjet recording ink composition that can be cured by irradiation with radiation such as ultraviolet rays (radiation curing type inkjet recording ink composition), since a majority of the component of the ink composition is cured by irradiation with radiation such as ultraviolet rays, the drying properties are excellent compared with a solvent-based ink composition and, furthermore, since an image obtained is resistant to spreading, the method can be applied to the printing of various types of substrate.

There is a demand for a radiation curing type ink composition that cures with high sensitivity in order to form a high quality image.

By achieving higher sensitivity for the ink composition, high curability upon exposure to actinic radiation can be imparted, and there are therefore provided various benefits such as a reduction in power consumption, longer lifetime of an actinic radiation generator due to a decrease in the load thereon, and suppression of evaporation of uncured low molecular weight material and of a reduction in the strength of an image formed.

Furthermore, there is a desire for an ink composition that gives an image (printed material) that is resistant to cracking, peeling off, etc., and gives a cured film that has excellent impact resistance, flexibility, and adhesion to a substrate. A cured film having high flexibility, impact resistance, and adhesion to a substrate enables a printed material to be displayed or stored for a long period of time in various environments while maintaining high image quality, and also has advantages such as ease of handling of the printed material.

An ink composition used for obtaining a molded printed sheet (decorative sheet) is required to have a high level of cured film flexibility since an ink coating is stretched during molding. Furthermore, it is necessary for the cured film to have a strength that can withstand molding. Conventionally, ink compositions having high flexibility have been disclosed (International Patent Applications WO 2002/038688 and WO 2005/026270), but they have the problems that the film strength is insufficient, scratches or pinholes are caused on an image during molding, and cracks occur due to poor resistance to stretching.

Moreover, an ink composition that can be used in vacuum forming or pressure forming and can be cured by irradiation with radiation such as ultraviolet rays has been disclosed (JP-A-2003-326591 (JP-A denotes a Japanese unexamined patent application publication)), but it has high viscosity and cannot be applied to the inkjet method.

BRIEF SUMMARY OF THE INVENTION

It is an object of the present invention to provide a process for producing a molded printed material that can suppress the occurrence of cracks and image dropouts when carrying out molding such as embossing, vacuum, pressure, or vacuum/pressure forming, and a molded printed material obtained by the process for producing a molded printed material.

These objects have been accomplished by means described in (1) and (5) below. They are described below together with (2) to (4), which are preferred embodiments.
(1) A process for producing a molded printed material comprising (A) a step of forming an image on a support by an inkjet method using an ink composition comprising a polymerizable monomer, a colorant, and a polymerization initiator, (B) a step of forming a surface coating layer on the image by an inkjet method using a liquid composition comprising a polymerizable monomer and a polymerization initiator and comprising substantially no colorant, (C) a step of curing the image by irradiation with actinic radiation, (D) a step of curing the surface coating layer by irradiation with actinic radiation so as to obtain a printed material having the image and the surface coating layer cured on the support, and (E) a step of molding the printed material,
(2) the process for producing a molded printed material according to (1) above, wherein the molding is embossing, vacuum forming, pressure forming, or vacuum/pressure forming,
(3) the process for producing a molded printed material according to (1) or (2) above, wherein at least one of the ink composition and the liquid composition is a radically polymerizable composition, the radically polymerizable composition comprises a monofunctional radically polymerizable monomer containing only one ethylenically unsaturated double bond group selected from the group consisting of an acrylate group, a methacrylate group, an acrylamide group, a methacrylamide group, and an N-vinyl group, and the content of the monofunctional radically polymerizable monomer in the composition is at least 65 wt %,
(4) the process for producing a molded printed material according to (1) or (2) above, wherein at least one of the ink composition and the liquid composition is a cationically polymerizable composition, the cationically polymerizable composition comprises at least one type of cationically polymerizable monomer selected from the group consisting of an oxetane compound, an oxirane compound, and a vinyl ether compound, and the proportion of the monofunctional cationically polymerizable monomer in the entire composition is at least 30 wt %, and
(5) a molded printed material obtained by the process for producing a molded printed material according to any one of (1) to (4) above.

DETAILED DESCRIPTION OF THE INVENTION

Figure 1:
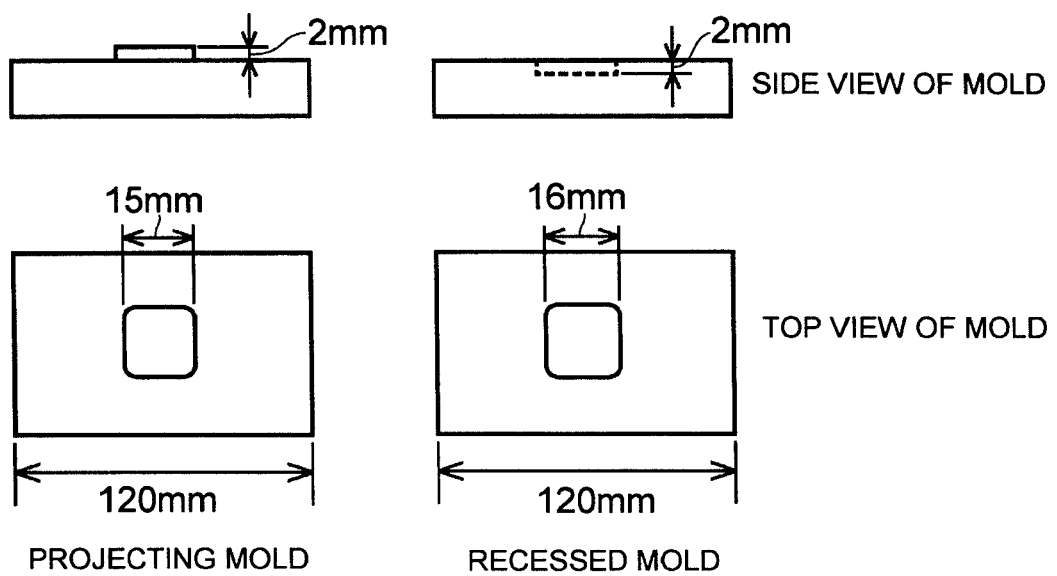
[FIG. 1] A schematic drawing of a projecting mold and a recessed mold used in the embossing test.

The process for producing a molded printed material of the present invention (hereinafter, also called simply the 'production process of the present invention') comprises (A) a step of forming an image on a support (hereinafter, also called a 'recording medium') by an inkjet method using an ink composition comprising a polymerizable monomer, a colorant, and a polymerization initiator (hereinafter, also called 'step (A)'), (B) a step of forming a surface coating layer on the image by an inkjet method using a liquid composition comprising a polymerizable monomer and a polymerization initiator and comprising substantially no colorant (hereinafter, also called 'step (B)'), (C) a step of curing the image by irradiation with actinic radiation (hereinafter, also called 'step (C)'), (D) a step of curing the surface coating layer by irradiation with actinic radiation and obtaining a printed material having the image and the surface coating layer cured on the support (hereinafter, also called 'step (D)'), and (E) a step of molding the printed material (hereinafter, also called 'step (E)').

The present invention is explained in detail below.

The process for producing a molded printed material of the present invention employs an ink composition (hereinafter, also called simply an 'ink') and a liquid composition containing substantially no colorant (hereinafter, also called a 'surface coating composition' or simply a 'liquid composition'). Furthermore, 'the ink composition and the surface coating composition' are also simply called 'compositions'.

The ink composition and the surface coating composition that can be used in the present invention are suitably both radically polymerizable compositions or cationically polymerizable compositions, and with regard to the ink composition and the surface coating composition, the same type of polymerizable composition may be used, or a combination of different types such as the ink composition being a radically polymerizable composition and the surface coating composition being a cationically polymerizable composition may be used. It is preferable for the ink composition and the surface coating composition to employ the same type of polymerizable composition.

With regard to the surface coating composition containing substantially no colorant, since there is very little absorption of actinic radiation by colorant, compared with the ink composition the curability is excellent. That is, in a printed material having the surface coated with the surface coating composition, a cured film having high abrasion resistance so that hardly any scratches or pinholes occur when subjecting it to molding can be formed. Furthermore, the strength of the cured film increases, and a cured film that is resistant to cracking during stretching can be formed.

Ink Composition and Surface Coating Composition

The ink composition and the surface coating composition that can be used in the present invention are ink compositions that can be cured by irradiation with actinic radiation.

The 'actinic radiation' referred to in the present invention is not particularly limited as long as it is actinic radiation that can provide energy that enables an initiating species to be generated in the composition when irradiated, and broadly includes α rays, γ rays, X rays, ultraviolet rays (UV), visible light, and an electron beam; among these, ultraviolet rays and an electron beam are preferable from the viewpoint of curing sensitivity and the availability of equipment, and ultraviolet rays are particularly preferable. The ink composition and/or the surface coating composition of the present invention are therefore preferably ones that can cure upon exposure to ultraviolet rays as radiation.

The ink composition that can be used in the present invention comprises at least a polymerizable monomer, a colorant, and a polymerization initiator.

The surface coating composition that can be used in the present invention comprises at least a polymerizable monomer and a polymerization initiator and comprises substantially no colorant.

'Comprises substantially no colorant' means that coloration of the liquid composition due to trace amounts of impurities or a slight degree of coloration due to components of the liquid composition such as the polymerizable compound or the polymerization initiator is allowed. From the viewpoint of color adjustment, the surface coating composition may comprise a very small amount of colorant such as a small amount of blue pigment added in order to correct coloration with a yellowish color due to, for example, the polymerizable compound, the polymerization initiator, etc., and from the viewpoint of maintaining the lightness of a printed material, a colorant may be used within a range of no greater than 0.1 wt % relative to the total amount of surface coating composition, but it is preferable for it not to comprise a colorant.

(1) Polymerizable Monomer

The ink composition and the surface coating composition that can be used in the present invention comprise at least a polymerizable monomer.

The polymerizable monomer that can be used in the present invention is preferably an addition polymerizable compound, and more preferably a radically polymerizable compound or a cationically polymerizable compound.

The polymerizable compound that can be used in the present invention may be used singly or in a combination of two or more types and, for example, a radically polymerizable compound and a cationically polymerizable compound may be used in combination.

Radically Polymerizable Compound

The radically polymerizable compound used in the present invention is not particularly limited as long as it is not to go beyond the scope of the present invention and various types of radically polymerizable compound may be used.

As the radically polymerizable compound, a photocuring material is known that employs a photopolymerizable composition described in, for example, JP-A-7-159983, JP-B-7-31399 (JP-B denotes a Japanese examined patent application publication), JP-A-8-224982, JP-A-10-863, JP-A-9-80675, etc.

The radically polymerizable compound is a compound having a radically polymerizable ethylenically unsaturated bond, and may be any compound as long as it has at least one radically polymerizable ethylenically unsaturated bond in the molecule; examples thereof include those having a chemical configuration such as a monomer, an oligomer, or a polymer. One type of radically polymerizable compound may be used, or two or more types thereof may be used in combination in order to improve an intended property.

Preferred examples of the cationically polymerizable compound that can be used in the present invention include a monofunctional radically polymerizable monomer containing ethylenically unsaturated double bond group selected from the group consisting of an acrylate group, a methacrylate group, an acrylamide group, a methacrylamide group, and an N-vinyl group.

Preferred examples of the cationically polymerizable compound that can be used in the present invention include a monofunctional radically polymerizable monomer containing only one ethylenically unsaturated double bond group selected from the group consisting of an acrylate group, a methacrylate group, an acrylamide group, a methacrylamide group, and an N-vinyl group, and the content of the monofunctional radically polymerizable monomer in the composition is preferably at least 65 wt %.

Preferred examples of the radically polymerizable compound that can be used in the present invention include N-vinyl group-containing cyclic monomers; it is more preferable to use N-vinylcarbazole, 1-vinylimidazole, or an N-vinyllactam, and it is yet more preferable to use an N-vinyllactam.

Preferred examples of the N-vinyllactam that can be used in the present invention include compounds represented by Formula (I) below.

(I)

In Formula (I), n denotes an integer of 1 to 5; n is preferably an integer of 2 to 4 from the viewpoints of flexibility after the ink composition is cured, adhesion to a recording medium, and starting material availability, n is more preferably 2 or 4, and n is particularly preferably 4, which is N-vinylcaprolactam. N-Vinylcaprolactam is preferable since it has excellent safety, is commonly used and easily available at a relatively low price, and gives particularly good ink curability and adhesion of a cured film to a recording medium.

The N-vinyllactam may have a substituent such as an alkyl group or an aryl group on the lactam ring, and may have a saturated or unsaturated ring structure bonded thereto.

As the N-vinyllactam is a compound having a relatively high melting point, when the N-vinyllactam is used, it is preferable for the content of the N-vinyllactam to be no greater than 40 wt % in the ink composition or the surface coating composition respectively since good solubility is exhibited even at a low temperature of 0° C. or less and the temperature range in which the ink composition can be handled becomes large.

Preferred examples of the radically polymerizable compound that can be used in the present invention include cyclic monomers having an acrylate group, a methacrylate group, an acrylamide group, a methacrylamide group, and/or a vinyl ether group, and more preferred examples thereof include cyclic monomers having an acrylate group, a methacrylate group, an acrylamide group, and/or a methacrylamide group.

Examples of the cyclic monomers include monomers having an aromatic group such as a phenyl group, a naphthyl group, an anthracenyl group, or a pyridinyl group, a heterocyclic group such as a tetrahydrofurfuryl group or a piperidinyl group, or a hydrocarbon cyclic group such as a cyclohexyl group, a cyclopentyl group, a cycloheptyl group, an isobornyl group, or a tricyclodecanyl group.

Preferred examples of the cyclic monomers having an acrylate group, a methacrylate group, and/or an acrylamide group include norbornyl (meth)acrylate, isobornyl (meth)acrylate, cyclohexyl (meth)acrylate, cyclopentyl (meth)acrylate, cycloheptyl (meth)acrylate, cyclooctyl (meth)acrylate, cyclodecyl (meth)acrylate, dicyclodecyl (meth)acrylate, trimethylcyclohexyl (meth)acrylate, 4-t-butylcyclohexyl (meth)acrylate, acryloylmorpholine, 2-benzyl (meth)acrylate, phenoxyethyl (meth)acrylate, phenoxydiethylene glycol (meth)acrylate, phenoxytriethylene glycol (meth)acrylate, EO-modified cresol (meth)acrylate, tetrahydrofurfuryl (meth)acrylate, caprolactone-modified tetrahydrofurfuryl acrylate, nonylphenoxy polyethylene glycol (meth)acrylate, neopentyl glycol benzoate (meth)acrylate, paracumylphenoxy ethylene glycol (meth)acrylate, N-phthalimidoethyl (meth)acrylate, pentamethylpiperidyl (meth)acrylate, tetramethylpiperidyl (meth)acrylate, N-cyclohexylacrylamide, N-(1,1-dimethyl-2-phenyl)ethylacrylamide, N-diphenylmethylacrylamide, N-phthalimidomethylacrylamide, N-(1,1'-dimethyl-3-(1,2,4-triazol-1-yl))propylacrylamide, and 5-(meth)acryloyloxymethyl-5-ethyl-1,3-dioxacyclohexane.

Furthermore, preferred examples of the cyclic monomers having an acrylate group, a methacrylate group, an acrylamide group, a methacrylamide group, and/or a vinyl ether group include (M-1) to (M-29) shown below.

Some of chemical formulae shown below are expressed as simplified structural formulae in which symbols for carbon (C) and hydrogen (H) of a hydrocarbon chain are omitted.

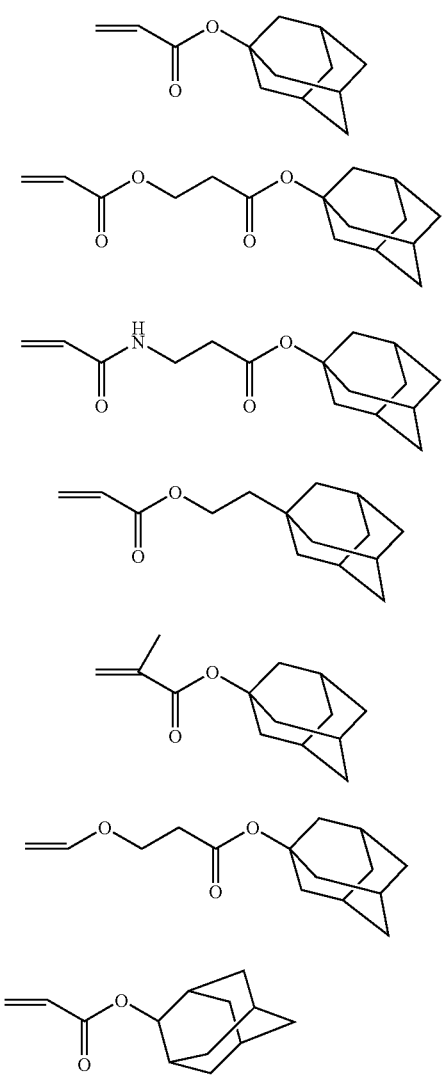

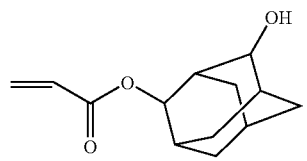
(M-8)

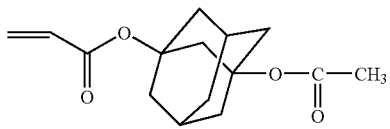
(M-9)

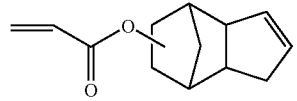
(M-10)

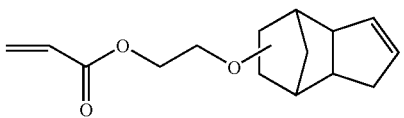
(M-11)

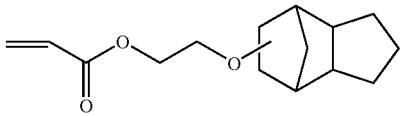
(M-12)

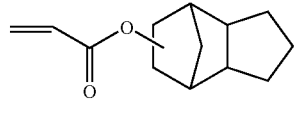
(M-13)

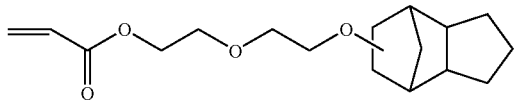
(M-14)

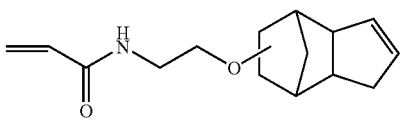
(M-15)

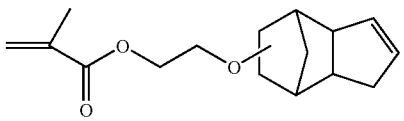
(M-16)

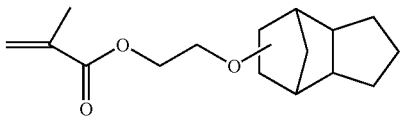
(M-17)

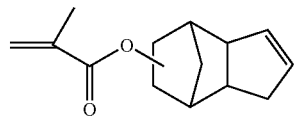
(M-18)

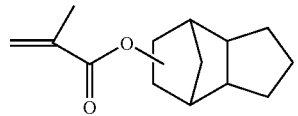
(M-19)

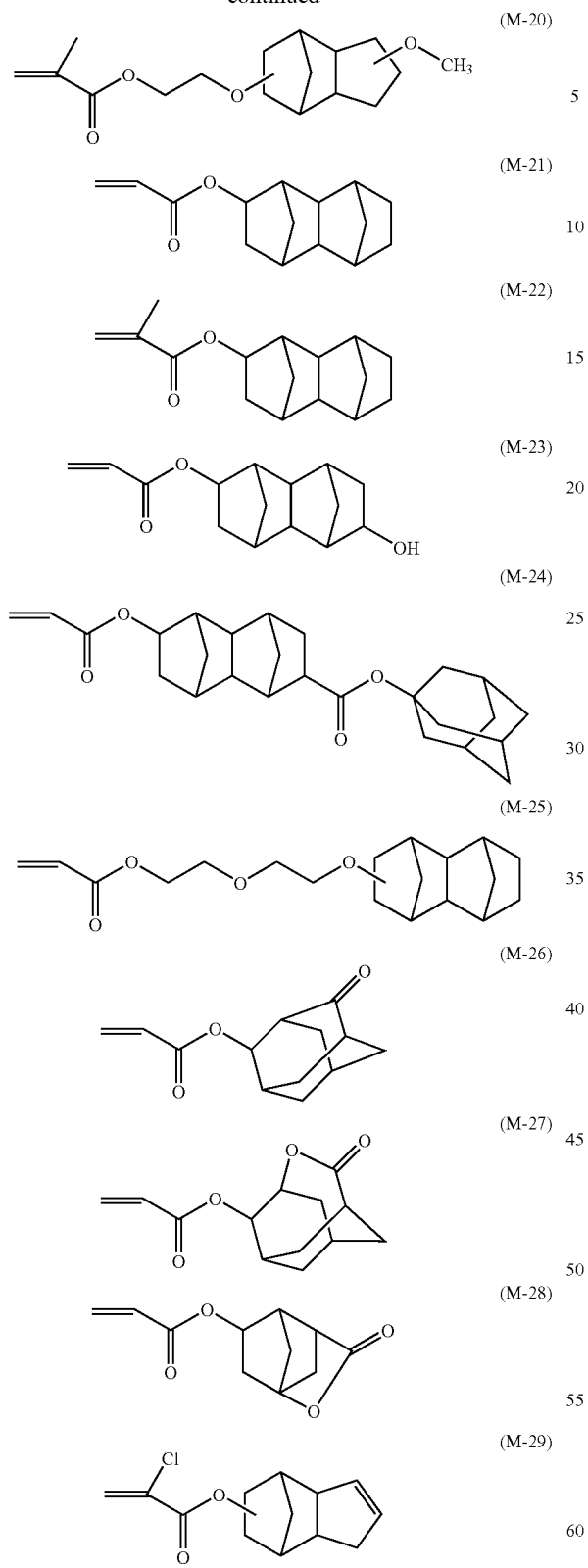
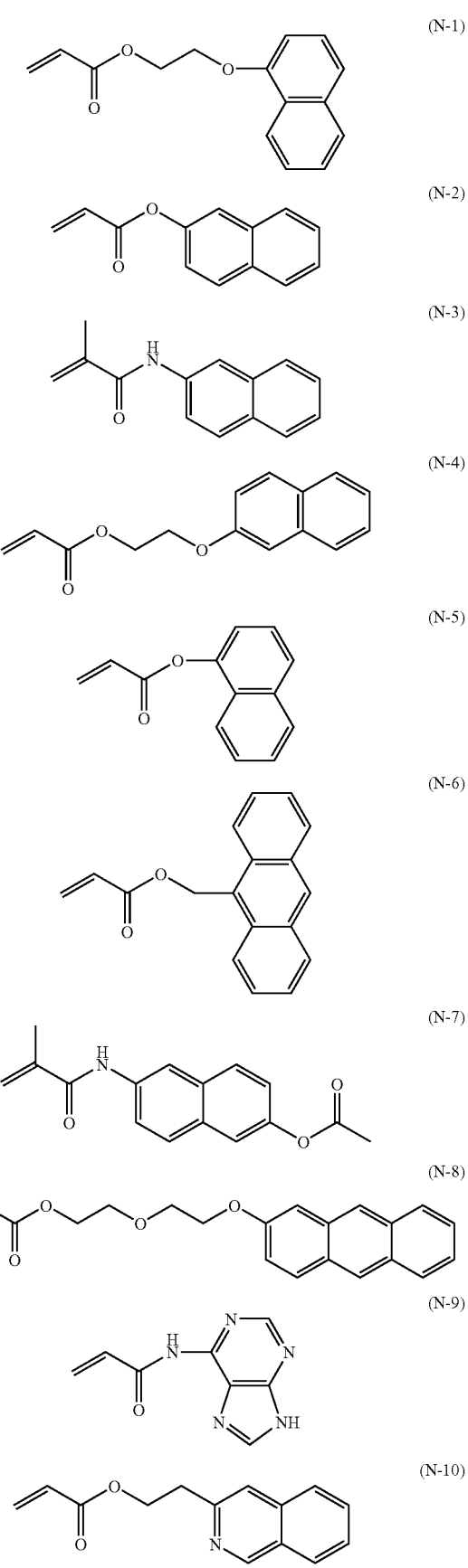
Moreover, preferred examples of the cyclic monomers having an acrylate group, a methacrylate group, an acrylamide group, and/or a methacrylamide group include (N-1) to (N-28) below.

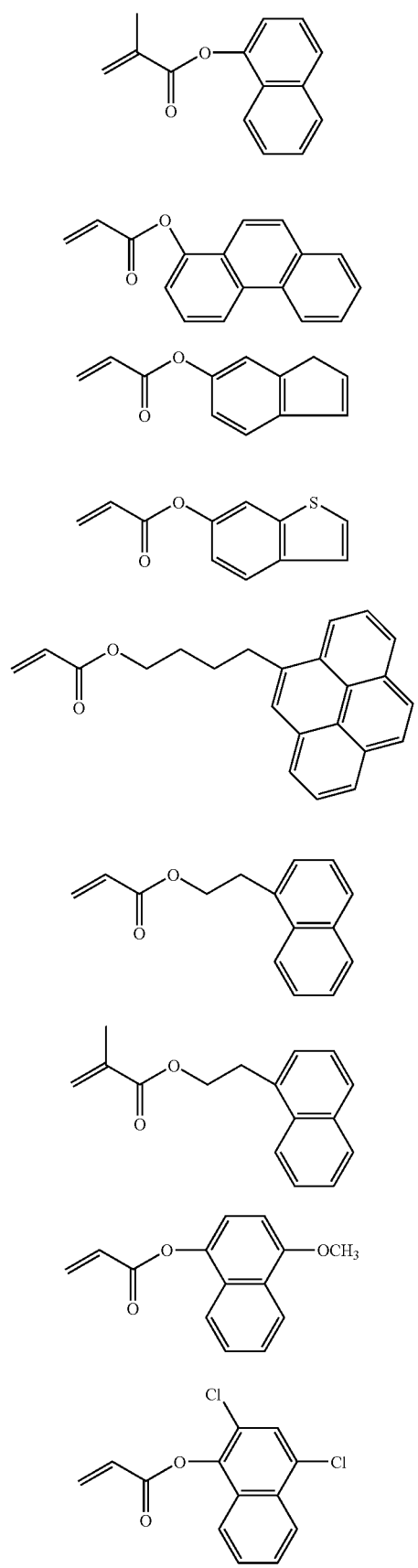
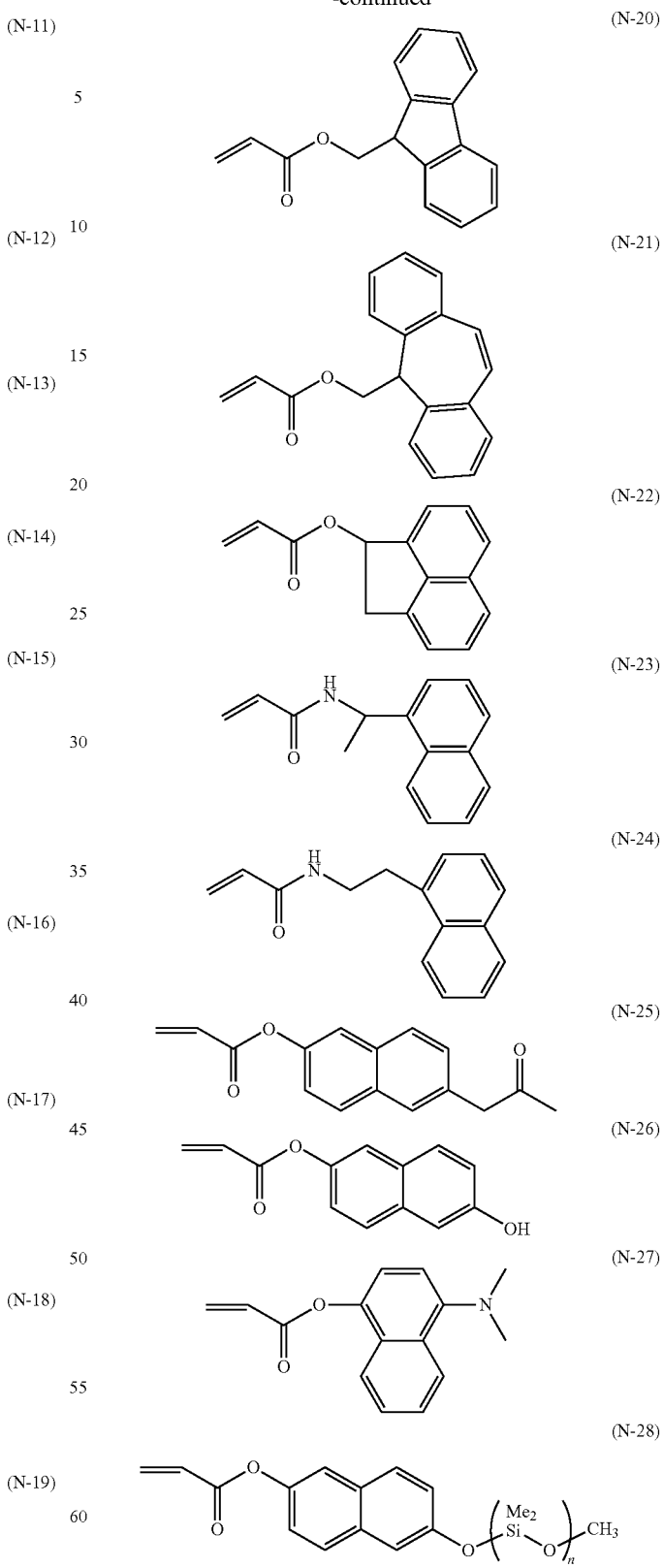
As the radically polymerizable monomer, an acyclic monofunctional monomer described below may be used in combination as necessary. The acyclic monofunctional monomer has relatively low viscosity and may be used preferably for the purpose of decreasing the viscosity of the composition. However, from the viewpoint of suppressing stickiness of a cured film and giving a high film strength so as not to cause scratches, etc. during molding, the proportion of the acyclic monofunctional monomer below in the entire composition is preferably no greater than 20 wt %, more preferably no greater than 15 wt %, and particularly preferably no greater than 10 wt %.

Specific examples thereof include octyl (meth)acrylate, 2-ethylhexyl (meth)acrylate, decyl (meth)acrylate, dodecyl (meth)acrylate, tridecyl (meth)acrylate, tetradecyl (meth) acrylate, hexadecyl (meth)acrylate, 2-hydroxyethyl acrylate, butoxyethyl acrylate, carbitol acrylate, 2-ethylhexyl diglycol acrylate, polyethylene glycol (meth)acrylate monomethyl ether, polypropylene glycol (meth)acrylate monomethyl ether, and polytetraethylene glycol (meth)acrylate monomethyl ether.

As the radically polymerizable monomer, a polyfunctional monomer described below may be used in combination as necessary. By containing a polyfunctional monomer, a composition having excellent curability and high cured film strength is obtained. From the viewpoint of cured film stretchability suitable for molding being maintained, the proportion of the polyfunctional monomer in the entire composition is preferably no greater than 15 wt %, more preferably no greater than 10 wt %, and particularly preferably no greater than 5 wt %.

Specific examples thereof include bis(4-acryloxypolyethoxyphenyl)propane, neopentyl glycol di(meth)acrylate, 1,6-hexanediol di(meth)acrylate, 1,9-nonanediol di(meth) acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, polypropylene glycol di(meth)acrylate, pentaerythritol triacrylate, pentaerythritol tetraacrylate, dipentaerythritol tetraacrylate, trimethylolpropane triacrylate, tetramethylolmethane tetraacrylate, tetramethylolmethane triacrylate, dimethyloltricyclodecane diacrylate, modified glycerol triacrylate, modified bisphenol A diacrylate, the diacrylate of a bisphenol A PO adduct, the diacrylate of a bisphenol A EO adduct, dipentaerythritol hexaacrylate, and caprolactone modified dipentaerythritol hexaacrylate.

Cationically Polymerizable Compound

The cationically polymerizable compound that can be used in the present invention is not particularly limited as long as it is a compound for which a polymerization reaction is initiated by a cationic polymerization initiating species generated from a cationic polymerization initiator, which is described later, and that cures, and various types of cationically polymerizable monomers known as cationically photopolymerizable monomers may be used. Preferred examples of the cationically polymerizable monomers include epoxy compounds, vinyl ether compounds, and oxetane compounds described in JP-A-6-9714, JP-A-2001-31892, JP-A-2001-40068, JP-A-2001-55507, JP-A-2001-310938, JP-A-2001-310937, and JP-A-2001-220526. Furthermore, as the cationically polymerizable compound, for example, a cationic polymerization type photocuring resin is known, and in recent years cationic photopolymerization type photocuring resins that have been sensitized in a visible light wavelength region of 400 nm or greater have also been disclosed in, for example, JP-A-643633 and JP-A-8-324137.

Examples of the epoxy compounds include aromatic epoxides, alicyclic epoxides, and aliphatic epoxides, and examples of the aromatic epoxide include di- or polyglycidyl ethers produced by a reaction between epichlorohydrin and a polyhydric phenol having at least one aromatic nucleus or an alkylene oxide adduct thereof; specific examples include di- or polyglycidyl ethers of bisphenol A or an alkylene oxide adduct thereof, di- or polyglycidyl ethers of hydrogenated bisphenol A or an alkylene oxide adduct thereof, and novolac type epoxy resins. Examples of the alkylene oxide above include ethylene oxide and propylene oxide.

Examples of the alicyclic epoxides include cyclohexene oxide- and cyclopentene oxide-containing compounds obtained by epoxidizing a compound having at least one cycloalkene ring such as a cyclohexene ring or a cyclopentene ring with an appropriate oxidizing agent such as hydrogen peroxide or a peracid.

Examples of the aliphatic epoxides include di- or polyglycidyl ethers of an aliphatic polyhydric alcohol or an alkylene oxide adduct thereof, and representative examples thereof include diglycidyl ethers of an alkylene glycol such as the diglycidyl ether of ethylene glycol, the diglycidyl ether of propylene glycol, and the diglycidyl ether of 1,6-hexanediol, polyglycidyl ethers of a polyhydric alcohol such as the di- or triglycidyl ether of glycerol or an alkylene oxide adduct thereof, and diglycidyl ethers of a polyalkylene glycol such as the diglycidyl ether of polyethylene glycol or an alkylene oxide adduct thereof and the diglycidyl ether of polypropylene glycol or an alkylene oxide adduct thereof. Examples of the alkylene oxide above include ethylene oxide and propylene oxide.

Detailed examples of monofunctional and polyfunctional epoxy compounds that can be used in the present invention are now given.

Examples of monofunctional epoxy compounds include phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monooxide, 1,2-epoxydodecane, epichlorohydrin, 1,2-epoxydecane, styrene oxide, cyclohexene oxide, 3-methacryloyloxymethylcyclohexene oxide, 3-acryloyloxymethylcyclohexene oxide, and 3-vinylcyclohexene oxide.

Furthermore, examples of polyfunctional epoxy compounds include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolac resins, hydrogenated bisphenol A diglycidyl ether, hydrogenated bisphenol F diglycidyl ether, hydrogenated bisphenol S diglycidyl ether, 3,4-epoxycyclohexenylmethyl-3',4'-epoxycyclohexenecarboxylate, bis(3,4-epoxycyclohexylmethyl)adipate, vinylcyclohexene oxide, 4-vinylepoxycyclohexane, bis(3,4-epoxy-6-methylcyclohexylmethyl)adipate, 3,4-epoxy-6-methylcyclohexenyl 3',4'-epoxy-6'-methylcyclohexenecarboxylate, methylenebis(3,4-epoxycyclohexane), dicyclopentadiene diepoxide, the di(3,4-epoxycyclohexylmethyl)ether of ethylene glycol, ethylene bis(3,4-epoxycyclohexanecarboxylate), dioctyl epoxyhexahydrophthalate, di-2-ethylhexyl epoxyhexahydrophthalate, 1,4-butanediol diglycidyl ether, 1,6-hexanediol diglycidyl ether, glycerol triglycidyl ether, trimethylolpropane triglycidyl ether, polyethylene glycol diglycidyl ether, polypropylene glycol diglycidyl ether, 1,13-tetradecadiene dioxide, limonene dioxide, 1,2,7,8-diepoxyoctane, and 1,2,5,6-diepoxycyclooctane.

Among these epoxy compounds, the aromatic epoxides and the alicyclic epoxides are preferable from the viewpoint of excellent curing speed, and the alicyclic epoxides are particularly preferable.

Examples of the vinyl ether compounds include di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether, and monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl vinyl ether, dodecyl vinyl ether, and diethylene glycol monovinyl ether.

Detailed examples of monofunctional vinyl ethers and polyfunctional vinyl ethers are given below.

Examples of monofunctional vinyl ethers include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexylmethyl vinyl ether, 4-methylcyclohexylmethyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxypolyethylene glycol vinyl ether.

Furthermore, examples of polyfunctional vinyl ethers include divinyl ethers such as ethylene glycol divinyl ether, diethylene glycol divinyl ether, polyethylene glycol divinyl ether, propylene glycol divinyl ether, butylene glycol divinyl ether, hexanediol divinyl ether, bisphenol A alkylene oxide divinyl ether, and bisphenol F alkylene oxide divinyl ether; and polyfunctional vinyl ethers such as trimethylolethane trivinyl ether, trimethylolpropane trivinyl ether, ditrimethylolpropane tetravinyl ether, glycerol trivinyl ether, pentaerythritol tetravinyl ether, dipentaerythritol pentavinyl ether, dipentaerythritol hexavinyl ether, an ethylene oxide adduct of trimethylolpropane trivinyl ether, a propylene oxide adduct of trimethylolpropane trivinyl ether, an ethylene oxide adduct of ditrimethylolpropane tetravinyl ether, a propylene oxide adduct of ditrimethylolpropane tetravinyl ether, an ethylene oxide adduct of pentaerythritol tetravinyl ether, a propylene oxide adduct of pentaerythritol tetravinyl ether, an ethylene oxide adduct of dipentaerythritol hexavinyl ether, and a propylene oxide adduct of dipentaerythritol hexavinyl ether.

As the vinyl ether compound, the di- or tri-vinyl ether compounds are preferable from the viewpoint of curability, adhesion to a recording medium, surface hardness of the image formed, etc., and the divinyl ether compounds are particularly preferable.

The oxetane compound that can be used in the present invention means a compound having an oxetane ring, and may be selected freely from known oxetane compounds such as those described in JP-A-2001-220526, JP-A-2001-310937, and JP-A-2003-341217.

As the compound having an oxetane ring that can be used in the present invention, a compound having 1 to 4 oxetane rings in the structure is preferable. In accordance with use of such a compound, it becomes easy to maintain the viscosity of the composition in a range that gives good handling properties and, furthermore, when the compound is used as the ink composition or the surface coating composition, the cured ink can be given high adhesion to the recording medium, which is preferable.

Examples of compounds having 1 to 2 oxetane rings in the molecule include compounds represented by Formulae (1) to (3) below.

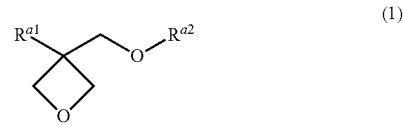

(1)

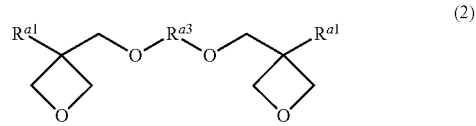

(2)

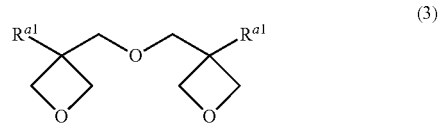

(3)

$R^{a1}$ denotes a hydrogen atom, an alkyl group having 1 to 6 carbons, a fluoroalkyl group having 1 to 6 carbons, an allyl group, an aryl group, a furyl group, or a thienyl group. When there are two $R^{a1}$ in the molecule, they may be identical to or different from each other.

Examples of the alkyl group include a methyl group, an ethyl group, a propyl group, and a butyl group, and preferred examples of the fluoroalkyl group include those obtained by substituting any of the hydrogen atoms of the above alkyl groups with a fluorine atom.

$R^{a2}$ denotes a hydrogen atom, an alkyl group having 1 to 6 carbons, an alkenyl group having 2 to 6 carbons, a group having an aromatic ring, an alkylcarbonyl group having 2 to 6 carbons, an alkoxycarbonyl group having 2 to 6 carbons, or an N-alkylcarbamoyl group having 2 to 6 carbons. Examples of the alkyl group include a methyl group, an ethyl group, a propyl group, and a butyl group, examples of the alkenyl group include a 1-propenyl group, a 2-propenyl group, a 2-methyl-1-propenyl group, a 2-methyl-2-propenyl group, a 1-butenyl group, a 2-butenyl group, and a 3-butenyl group, and examples of the group having an aromatic ring include a phenyl group, a benzyl group, a fluorobenzyl group, a methoxybenzyl group, and a phenoxyethyl group. Examples of the alkylcarbonyl group include an ethylcarbonyl group, a propylcarbonyl group, and a butylcarbonyl group, examples of the alkoxycarbonyl group include an ethoxycarbonyl group, a propoxycarbonyl group, and a butoxycarbonyl group, and examples of the N-alkylcarbamoyl group include an ethylcarbamoyl group, a propylcarbamoyl group, a butylcarbamoyl group, and a pentylcarbamoyl group. Furthermore, $R^{a2}$ may have a substituent, and the substituent include an alkyl group having 1 to 6 carbons and a fluorine atom.

$R^{a3}$ denotes a linear or branched alkylene group, a linear or branched poly(alkyleneoxy) group, a linear or branched unsaturated hydrocarbon group, a carbonyl group, a carbonyl group-containing alkylene group, a carboxyl group-containing alkylene group, a carbamoyl group-containing alkylene group, or a group shown below. Examples of the alkylene group include an ethylene group, a propylene group, and a butylene group, and examples of the poly(alkyleneoxy) group include a poly(ethyleneoxy) group and a poly(propyleneoxy)

group. Examples of the unsaturated hydrocarbon group include a propenylene group, a methylpropenylene group, and a butenylene group.

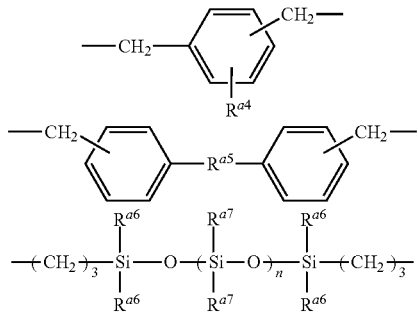

When $R^{a3}$ is the above-mentioned polyvalent group, $R^{a4}$ denotes a hydrogen atom, an alkyl group having 1 to 4 carbons, an alkoxy group having 1 to 4 carbons, a halogen atom, a nitro group, a cyano group, a mercapto group, a lower alkylcarboxyl group, a carboxyl group, or a carbamoyl group.

$R^{a5}$ denotes an oxygen atom, a sulfur atom, a methylene group, NH, SO, $SO_2$, $C(CF_3)_2$, or, $C(CH_3)_2$.

$R^{a6}$ denotes an alkyl group having 1 to 4 carbons or an aryl group, and n is an integer of 0 to 2,000. $R^{a7}$ denotes an alkyl group having 1 to 4 carbons, an aryl group, or a monovalent group having the structure below. In the formula, $R^{a8}$ denotes an alkyl group having 1 to 4 carbons or an aryl group, and m is an integer of 0 to 100.

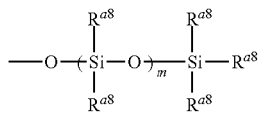

Examples of compounds represented by Formula (1) include 3-ethyl-3-hydroxymethyloxetane (OXT-101: Toagosei Co., Ltd.), 3-ethyl-3-(2-ethylhexyloxymethyl)oxetane (OXT-212: Toagosei Co., Ltd.), and 3-ethyl-3-phenoxymethyloxetane (OXT-211: Toagosei Co., Ltd.). Examples of compounds represented by Formula (2) include 1,4-bis[(3-ethyl-3-oxetanylmethoxy)methyl]benzene (OXT-121: Toagosei Co., Ltd.). Examples of compounds represented by Formula (3) include bis(3-ethyl-3-oxetanylmethyl)ether (OXT-221: Toagosei Co., Ltd.).

Examples of the compound having 3 to 4 oxetane rings in the molecule include compounds represented by Formula (4) below.

(4)

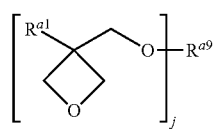

In Formula (4), $R^{a1}$ denotes the same as in Formula (1) above. Furthermore, examples of $R^{a9}$, which is a polyvalent linking group, include a branched alkylene group having 1 to 12 carbons such as a group represented by A to C below, a branched poly(alkyleneoxy) group such as a group represented by D below, and a branched polysiloxane group such as a group represented by E below. j is 3 or 4.

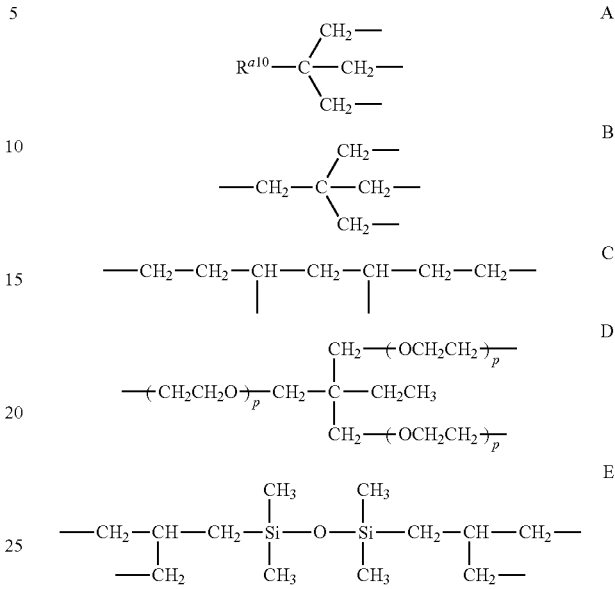

In the above A, $R^{a10}$ denotes a methyl group, an ethyl group, or a propyl group. Furthermore, in the above D, p is an integer of 1 to 10.

Moreover, as another embodiment of the oxetane compound that can be suitably used in the present invention, a compound having an oxetane ring on a side chain, represented by Formula (5) below, can be cited.

(5)

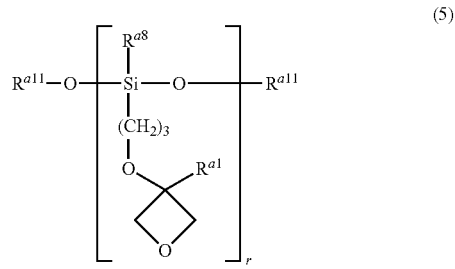

In Formula (5), $R^{a1}$ and $R^{a8}$ denote the same as in the above-mentioned formulae. $R^{a11}$ is an alkyl group having 1 to 4 carbons such as a methyl group, an ethyl group, a propyl group, or a butyl group, or a trialkylsilyl group, and r is 1 to 4.

Such compounds having an oxetane ring are described in detail in paragraph Nos. [0021] to [0084] of JP-A-2003-341217 above, and the compounds described here may be suitably used in the present invention.

Among the oxetane compounds used in the present invention, from the viewpoint of ink composition viscosity and tackiness, it is preferable to use a compound having one oxetane ring. Furthermore, the oxetane compounds described in JP-A-2004-91556 also may be used in the present invention. The compounds are described in detail in paragraph Nos. [0022] to [0058] in JP-A-2004-91556.

The cationically polymerizable composition that can be used in the present invention may be used only singly or in a combination of two or more types, but from the viewpoint of suppressing effectively shrinkage during ink curing, it is preferable to use a combination of a vinyl ether compound and at least one type of compound selected from the oxetane compounds and the epoxy compounds.

In the present invention, when a polyfunctional oxetane compound and/or a polyfunctional oxirane compound are used, the total amount of the polyfunctional oxetane compound and the polyfunctional oxirane compound is preferably less than 25 wt % of the entirety of the ink composition or the surface coating composition respectively. At a proportion of less than 25 wt %, an ink composition or a surface coating composition having excellent cured film stretchability can be provided.

In the present invention, when a cationically polymerizable compound is used, it is preferable for it to comprise an oxetane compound and an oxirane compound, and it is more preferable for it to comprise a polyfunctional oxirane compound and a polyfunctional oxetane compound. Making an oxetane compound and an oxirane compound coexist in the composition enables a composition to be provided that has excellent curability and gives a cured film having high release properties from a mold during a molding process and high abrasion resistance such as scratch resistance. It is more preferable for a polyfunctional oxetane compound and a polyfunctional oxirane compound to coexist.

Moreover, in the present invention, when a monofunctional cationically polymerizable compound is used, among the monofunctional monomers it is preferable for it to comprise at least a monofunctional oxirane compound or a monofunctional oxetane compound, and it is particularly preferable for it to comprise a monofunctional oxetane compound.

Among the monofunctional monomers, it is preferable to use a monomer containing a cyclic group such as an aromatic group, an alicyclic cyclic group, or a heterocycle-containing group.

Preferred examples of the cationically polymerizable compound that can be used in the present invention include the cyclic structure-containing monomers (C-1) to (C-24) shown below.

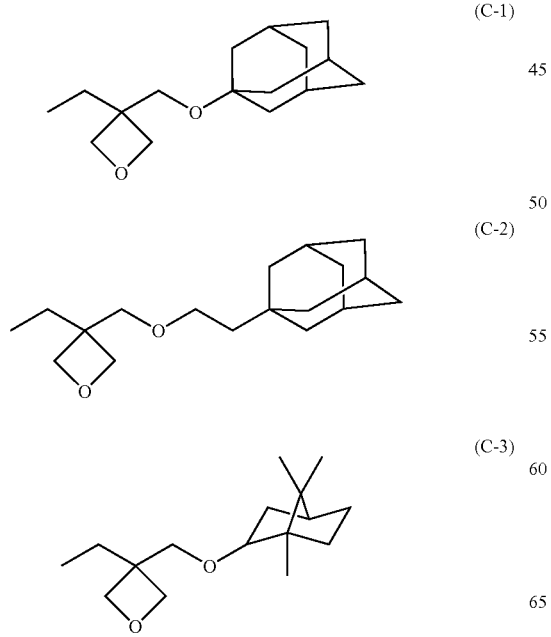

(C-1)

(C-2)

(C-3)

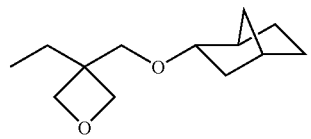

(C-4)

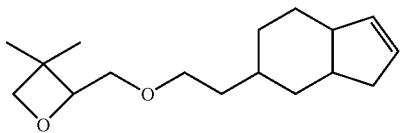

(C-5)

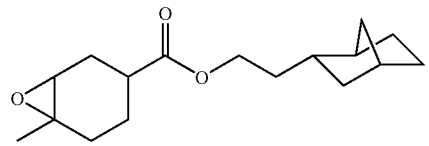

(C-6)

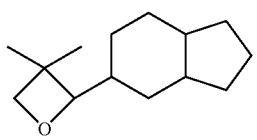

(C-7)

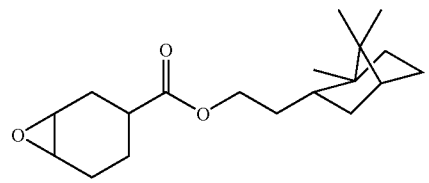

(C-8)

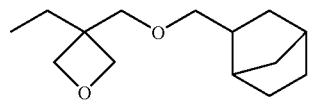

(C-9)

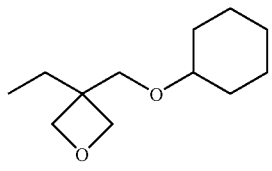

(C-10)

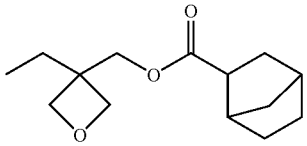

(C-11)

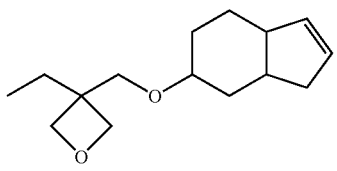

(C-12)

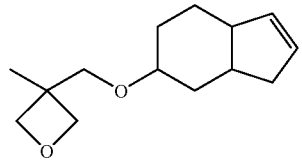

(C-13)

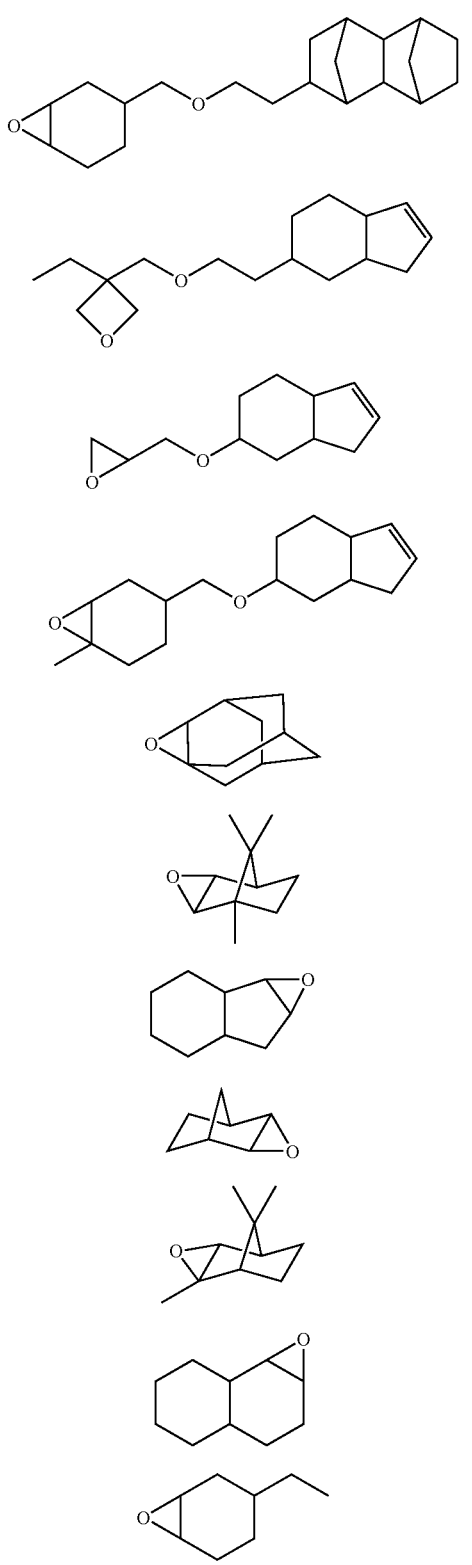

In the present invention, it is preferable to use a monomer having a cyclic structure in the surface coating composition, and it is particularly preferable to use a monomer having a cyclic structure in both the ink composition and the surface coating composition.

The polymerizable monomer in each of the ink composition and the surface coating composition that can be used in the present invention is preferably 60 to 95 parts by weight relative to the total amount of the composition, more preferably 65 to 90 parts by weight, and yet more preferably 70 to 90 parts by weight. It is preferable for it to be in the above-mentioned range since the curability is excellent and the viscosity is appropriate.

Among the polymerizable monomers in the ink composition or the surface coating composition that can be used in the present invention, it is preferable for at least one thereof to be a monofunctional monomer, and it is more preferable for at least one thereof to be a monofunctional acrylate. It is preferable to use a monofunctional monomer since sufficient curability as well as sufficient flexibility of a cured film can be obtained.

When a monofunctional radically polymerizable monomer is used as the polymerizable monomer, the proportion of the monofunctional radically polymerizable monomer in the composition is preferably 1 to 90 parts by weight, more preferably 50 to 90 parts by weight, and yet more preferably 65 to 90 parts by weight. It is preferable for the proportion to be in the above-mentioned range since the curability and the flexibility are excellent and the viscosity is appropriate.

When a monofunctional cationically polymerizable monomer is used as the polymerizable monomer, the proportion of the monofunctional cationically polymerizable monomer in the composition is preferably 1 to 90 parts by weight, more preferably 20 to 90 parts by weight, and yet more preferably 30 to 90 parts by weight. It is preferable for the proportion to be in the above-mentioned range since the curability and the flexibility are excellent and the viscosity is appropriate.

When a di- or higher-functional monomer (polyfunctional monomer) is present as the polymerizable monomer, the proportion of the di- or higher-functional monomer is preferably 0.5 to 50 parts by weight, more preferably 0.5 to 30 parts by weight, and yet more preferably 0.5 to 20 parts by weight. It is preferable for the proportion to be in the above-mentioned range since the curability and the flexibility are excellent and the viscosity is appropriate.

Polymerization Initiator

As a polymerization initiator that can be used in the present invention, a known polymerization initiator may be used. The polymerization initiator that can be used in the present invention may be used singly or in a combination of two or more types. Furthermore, the radical polymerization initiator may be used in combination with a cationic polymerization initiator.

The polymerization initiator that can be used in the ink composition of the present invention is a compound that forms a polymerization initiating species by absorbing external energy. The external energy used for initiating polymerization can be broadly divided into heat and actinic radiation, and a thermal polymerization initiator and a photopolymerization initiator are used respectively. Examples of the actinic radiation include γ rays, β rays, an electron beam, ultraviolet rays, visible light, and infrared rays.

Radical Polymerization Initiator

Examples of the radical polymerization initiator that can be used in the present invention include (a) an aromatic ketone, (b) an acylphosphine compound, (c) an aromatic onium salt compound, (d) an organic peroxide, (e) a thio compound, (f) a hexaarylbiimidazole compound, (g) a ketoxime ester compound, (h) a borate compound, (i) an azinium compound, (j) a metallocene compound, (k) an active ester compound, (l) a compound having a carbon-halogen bond, and (m) an alkylamine compound. With regard to these radical polymerization initiators, the above-mentioned compounds (a) to (m) may be used singly or in combination. The radical polymerization initiator in the present invention may suitably be used singly or in a combination of two or more types.

Preferred examples of the aromatic ketone (a) and the thio compound (e) include a compound having a benzophenone skeleton (benzophenone compound) or a compound having a thioxanthone skeleton (thioxanthone compound) described in 'RADIATION CURING IN POLYMER SCIENCE AND TECHNOLOGY' J. P. FOUASSIER and J. F. RABEK (1993), pp. 77 to 117. Preferred examples of the aromatic ketone (a), the acylphosphine compound (b) and the thio compound (e) include an α-thiobenzophenone compound described in JP-B-47-6416, a benzoin ether compound described in JP-B-47-3981, an α-substituted benzoin compound described in JP-B-47-22326, a benzoin derivative described in JP-B-47-23664, an aroylphosphonic acid ester described in JP-A-57-30704, a dialkoxybenzophenone described in JP-B-60-26483, benzoin ethers described in JP-B-60-26403 and JP-A-62-81345, α-aminobenzophenones described in JP-B-1-34242, U.S. Pat. No. 4,318,791, and EP No. 0284561A1, p-di(dimethylaminobenzoyl)benzene described in JP-A-2-211452, a thio-substituted aromatic ketone described in JP-A-61-194062, an acylphosphine sulfide described in JP-B-2-9597, an acylphosphine described in JP-B-2-9596, a thioxanthone described in JP-B-63-61950, and a coumarin described in JP-B-59-42864.

Examples of the benzophenone compound include benzophenone, 4-phenylbenzophenone, isophthalophenone, and 4-benzoyl-4'-methylphenylsulfide. Examples of the thioxanthone compound include 2,4-diethylthioxanthone, 2-isopropylthioxanthone, and 2-chlorothioxanthone.

In the present invention, the aromatic ketone (a) is preferably an α-hydroxyketone, and examples thereof include 1-[4-(2-hydroxyethoxy)phenyl]-2-hydroxy-2-methyl-1-propan-1-one, 2-hydroxy-2-methyl-1-phenylpropan-1-one, and 1-hydroxycyclohexyl phenyl ketone.

Among them, the aromatic ketone (a) is particularly preferably a 1-hydroxycyclohexyl phenyl ketone compound. The 1-hydroxycyclohexyl phenyl ketone compound referred to in the present invention means 1-hydroxycyclohexyl phenyl ketone and a compound obtained by substituting 1-hydroxycyclohexyl phenyl ketone with any substituent. The substituent may be selected freely from a range that enables an ability as a radical polymerization initiator to be exhibited, and specific examples thereof include an alkyl group (e.g. a methyl group, an ethyl group, a propyl group, a butyl group, etc.).

In the present invention, the acylphosphine compound (b) is preferably an acylphosphine oxide compound.

Examples of the acylphosphine oxide compound include a compound having a structure represented by Formula (7) or (8).

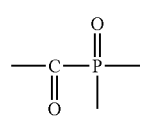

Formula (7)

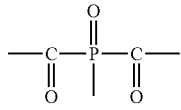

Formula (8)

The acylphosphine oxide compound is particularly preferably one having a chemical structure represented by Formula (9) or (10).

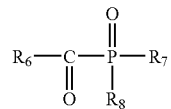

Formula (9)

(In the formula, $R_6$, $R_7$, and $R_8$ denote an aromatic hydrocarbon group, which may have a methyl group or an ethyl group as a substituent.)

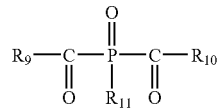

Formula (10)

(In the formula, $R_9$, $R_{10}$, and $R_{11}$ denote an aromatic hydrocarbon group, which may have a methyl group or an ethyl group as a substituent.)

As the acylphosphine oxide compound, a monoacylphosphine oxide compound, a bisacylphosphine oxide compound, etc. may be used, and as the monoacylphosphine oxide compound, a known monoacylphosphine oxide compound may be used. Examples thereof include monoacylphosphine oxide compounds described in JP-B-60-8047 and JP-B-6340799. Specific examples thereof include methyl isobutyrylmethylphosphinate, methyl isobutyrylphenylphosphinate, methyl pivaloylphenylphosphinate, methyl 2-ethylhexanoylphenylphosphinate, isopropyl pivaloylphenylphosphinate, methyl p-tolylphenylphosphinate, methyl o-tolylphenylphosphinate, methyl 2,4-dimethylbenzoylphenylphosphinate, isopropyl p-t-butylbenzoylphenylphosphinate, methyl acryloylphenylphosphinate, isobutyryldiphenylphosphine oxide, 2-ethylhexanoyldiphenylphosphine oxide, o-tolyldiphenylphosphine oxide, p-t-butylbenzoyldiphenylphosphine oxide, 3-pyridylcarbonyldiphenylphosphine oxide, acryloyidiphenylphosphine oxide, benzoyidiphenylphosphine oxide, vinyl pivaloylphenylphosphinate, adipoyl-bis-diphenylphosphine oxide, pivaloyidiphenylphosphine oxide, p-tolyidiphenylphosphine oxide, 4-(t-butyl)benzoyldiphenylphosphine oxide, terephthaloyl-bis-diphenylphosphine oxide, 2-methylbenzoyldiphenylphosphine oxide, versatoyldiphenylphosphine oxide, 2-methyl-2-ethylhexanoyldiphenylphosphine oxide, 1-methylcyclohexanoyldiphenylphosphine oxide, methyl pivaloylphenylphosphinate, and isopropyl pivaloylphenylphosphinate.

As the bisacylphosphine oxide compound, a known bisacylphosphine oxide compound may be used. Examples thereof include bisacylphosphine oxide compounds described in JP-A-3-101686, JP-A-5-345790, and JP-A-6-298818. Specific examples thereof include bis(2,6-dichlorobenzoyl)phenylphosphine oxide, bis(2,6-dichlorobenzoyl)-2,5-dimethylphenylphosphine oxide, bis(2,6-dichlorobenzoyl)-4-ethoxyphenylphosphine oxide, bis(2,6-dichlorobenzoyl)-4-propylphenylphosphine oxide, bis(2,6-dichlorobenzoyl)-2-naphthylphosphine oxide, bis(2,6-dichlorobenzoyl)-1-naphthylphosphine oxide, bis(2,6-dichlorobenzoyl)-4-chlorophenylphosphine oxide, bis(2,6-dichlorobenzoyl)-2,4-dimethoxyphenylphosphine oxide, bis(2,6-dichlorobenzoyl)decylphosphine oxide, bis(2,6-dichlorobenzoyl)-4-octylphenylphosphine oxide, bis(2,4,6-trimethylbenzoyl)phenylphosphine oxide, bis(2,4,6-trimethylbenzoyl)-2,5-dimethylphenylphosphine oxide, bis(2,6-dichloro-3,4,5-trimethoxybenzoyl)-2,5- dimethylphenylphosphine oxide, bis(2,6-dichloro-3,4,5-trimethoxybenzoyl)-4-ethoxyphenylphosphine oxide, bis(2-methyl-1-naphthoyl)-2,5-dimethylphenylphosphine oxide, bis(2-methyl-1-naphthoyl)-4-ethoxyphenylphosphine oxide, bis(2-methyl-1-naphthoyl)-2-naphthylphosphine oxide, bis (2-methyl-1-naphthoyl)-4-propylphenylphosphine oxide, bis (2-methyl-1-naphthoyl)-2,5-dimethylphenylphosphine oxide, bis(2-methoxy-1-naphthoyl)-4-ethoxyphenylphosphine oxide, bis(2-chloro-1-naphthoyl)-2,5-dimethylphenylphosphine oxide, and bis(2,6-dimethoxybenzoyl)-2,4,4-trimethylpentylphosphine oxide.

Among them, preferred examples of the acylphosphine oxide compound in the present invention include bis(2,4,6-trimethylbenzoyl)phenylphosphine oxide (IRGACURE 819: manufactured by Ciba Specialty Chemicals), bis(2,6-dimethoxybenzoyl)-2,4,4-trimethylpentylphenylphosphine oxide, and 2,4,6-trimethylbenzoyldiphenylphosphine oxide (Darocur TPO: manufactured by Ciba Specialty Chemicals, Lucirin TPO: manufactured by BASF).

As the aromatic onium salt compound (c), there can be cited aromatic onium salts of elements of Groups 15, 16, and 17 of the periodic table, specifically, N, P, As, Sb, Bi, O, S, Se, Te, and I. Examples thereof include iodonium salts described in EP No. 104143, U.S. Pat. No. 4,837,124, JP-A-2-150848, and JP-A-2-96514, diazonium salts (optionally substituted benzenediazoniums, etc.) described in EP Nos. 370693, 233567, 297443, 297442, 279210, and 422570, U.S. Pat. Nos. 3,902,144, 4,933,377, 4,760,013, 4,734,444, and 2,833, 827, diazonium salt resins (diazodiphenylamine formaldehyde resins, etc.), N-alkoxypyridinium salts, etc. (e.g. those described in U.S. Pat. No. 4,743,528, JP-A-63-138345, JP-A-63-142345, JP-A-63-142346, and JP-B-46-42363; specific examples thereof include 1-methoxy-4-phenylpyridinium tetrafluoroborate); furthermore, compounds described in JP-B-52-147277, 52-14278, and 52-14279 may suitably be used. A radical or an acid is formed as an active species.

As the organic peroxide (d), almost all organic compounds having at least one oxygen-oxygen bond per molecule can be cited, and preferred examples thereof include peroxide ester compounds such as 3,3',4,4'-tetra(t-butylperoxycarbonyl)benzophenone, 3,3',4,4'-tetra(t-amylperoxycarbonyl)benzophenone, 3,3',4,4'-tetra(t-hexylperoxycarbonyl)benzophenone, 3,3',4,4'-tetra(t-octylperoxycarbonyl)benzophenone, 3,3',4,4'-tetra(cumylperoxycarbonyl)benzophenone, 3,3',4, 4'-tetra(p-isopropylcumylperoxycarbonyl)benzophenone, and di-t-butyldiperoxyisophthalate.

As the hexaarylbiimidazole compound (f), there can be cited Iophine dimers described in JP-B-45-37377 and JP-B-44-86516, and examples thereof include 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl)biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole, and 2,2'-bis(o-trifluorophenyl)-4,4', 5,5'-tetraphenylbiimidazole.

As the ketoxime ester compound (g), there can be cited 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxyiminobutan-2-one, and 2-ethoxycarbonyloxyimino-1-phenylpropan-1-one.

Examples of the borate compound (h) include compounds described in U.S. Pat. Nos. 3,567,453 and 4,343,891, and EP Nos. 109,772 and 109,773.

Examples of the azinium salt compound (i) include N—O bond-containing compounds described in JP-A-63-138345, JP-A-63-142345, JP-A-63-142346, JP-A-63-143537, and JP-B-46-42363.

Examples of the metallocene compound (j) include titanocene compounds described in JP-A-59-152396, JP-A-61-151197, JP-A-63-41484, JP-A-2-249, and JP-A-2-4705, and iron-arene complexes described in JP-A-1-304453 and JP-A-1-152109.

Specific examples of the titanocene compound include dichlorobis(cyclopentadienyl)titanium, bis(cyclopentadienyl)bis(phenyl)titanium, bis(cyclopentadienyl)bis(2,3,4,5, 6-pentafluorophen-1-yl)titanium, bis(cyclopentadienyl)bis (2,3,5,6-tetrafluorophen-1-yl)titanium, bis (cyclopentadienyl)bis(2,4,6-trifluorophen-1-yl)titanium, bis (cyclopentadienyl)bis(2,6-difluorophen-1-yl)titanium, bis (cyclopentadienyl)bis(2,4-difluorophen-1-yl)titanium, bis (methylcyclopentadienyl)bis(2,3,4,5,6-pentafluorophen-1-yl)titanium, bis(methylcyclopentadienyl)bis(2,3,5,6-tetrafluorophen-1-yl)titanium, bis(methylcyclopentadienyl) bis(2,4-difluorophen-1-yl)titanium, bis(cyclopentadienyl)bis [2,6-difluoro-3-(pyrr-1-yl)phenyl]titanium, bis (cyclopentadienyl)bis[2,6-difluoro-3-(methylsulfonamido) phenyl]titanium, and bis(cyclopentadienyl)bis[2,6-difluoro-3-(N-butylbiaroylamino)phenyl]titanium.

Examples of the active ester compound (k) include nitrobenzyl ester compounds described in EP Nos. 0290750, 046083, 156153, 271851, and 0388343, U.S. Pat. Nos. 3,901, 710 and 4,181,531, JP-A-60-198538, and JP-A-53-133022, iminosulfonate compounds described in EP Nos. 0199672, 84515, 199672, 044115, and 0101122, U.S. Pat. Nos. 4,618, 564, 4,371,605, and 4431774, JP-A-64-18143, JP-A-2-245756, and JP-A-4-365048, and compounds described in JP-B-62-6223, JP-B-63-14340, and JP-A-59-174831.

Preferred examples of the compound (l) having a carbon-halogen bond include a compound described in Wakabayashi et. al, Bull. Chem. Soc. Japan, 42, 2924 (1969), a compound described in British Patent No. 1388492, a compound described in JP-A-53-133428, and a compound described in German Patent No. 3337024.

Examples further include a compound described in F. C. Schaefer et al., J. Org. Chem., 29, 1527 (1964), a compound described in JP-A-62-58241, a compound described in JP-A-5-281728, a compound described in German Pat. No. 2641100, a compound described in German Pat. No. 3333450, compounds described in German Pat. No. 3021590, and compounds described in German Pat. No. 3021599.

Cationic Polymerization Initiator

When a cationically polymerizable compound is used in the present invention, it is preferable to use a cationic polymerization initiator. Examples of the cationic polymerization initiator (photo-acid generator) that can be used in the present invention include chemically amplified photoresists and compounds used in cationic photopolymerization ('Imejingu you Yukizairyou' (Organic Materials for Imaging), Ed. The Japanese Research Association for Organic Electronics Materials, Bunshin Publishing Co. (1993), pp. 187-192). Preferred examples of the cationic polymerization initiator in the present invention are listed below.

Firstly, $B(C_6F_5)_4^-$, $PF_6^-$, $AsF_6^-$, $SbF_6^-$, and $CF_3SO_3^-$ salts of diazonium, ammonium, iodonium, sulfonium, phosphonium, etc. aromatic onium compounds can be cited. Secondly, sulfonated materials that generate a sulfonic acid can be cited. Thirdly, halides that photogenerate a hydrogen halide can also be used. Fourthly, iron arene complexes can be cited.

Examples [(b-1) to (b-96)] of cationic polymerization initiators that are suitably used in the present invention are listed below, but the present invention should not be construed as being limited thereby.

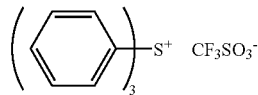  (b-1)

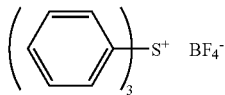  (b-2)

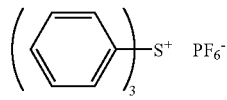  (b-3)

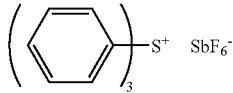  (b-4)

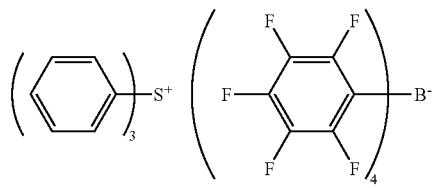  (b-5)

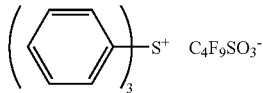  (b-6)

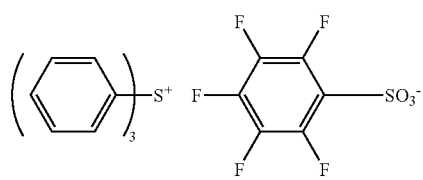  (b-7)

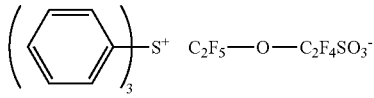  (b-8)

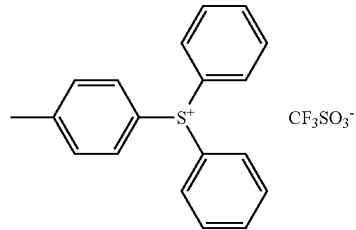  (b-9)

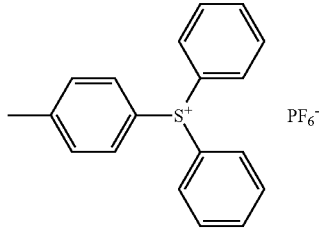  (b-10)

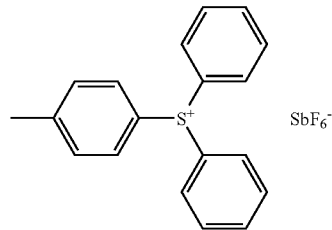  (b-11)

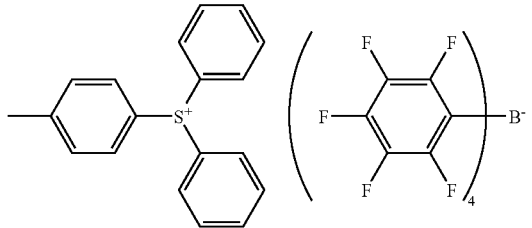  (b-12)

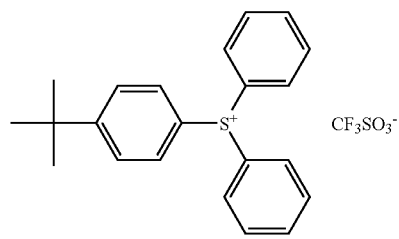  (b-13)

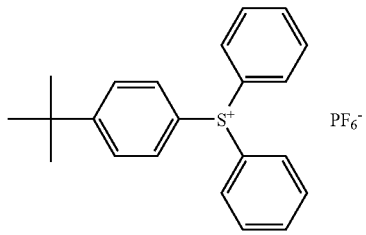  (b-14)

-continued
(b-15)
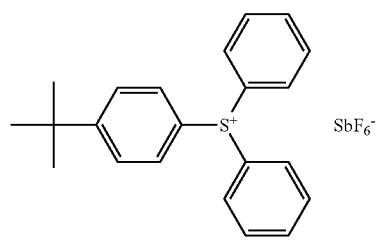 SbF$_6^-$
(b-16)
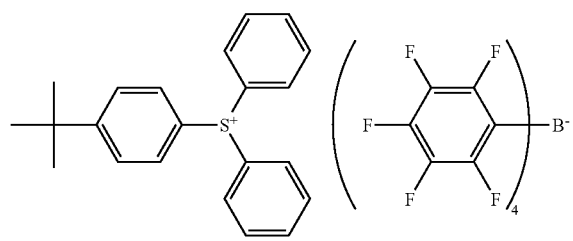
(b-17)
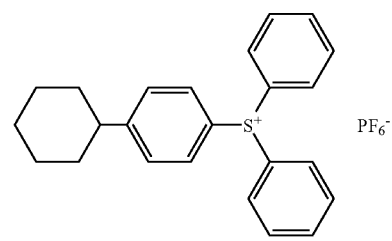 PF$_6^-$
(b-18)
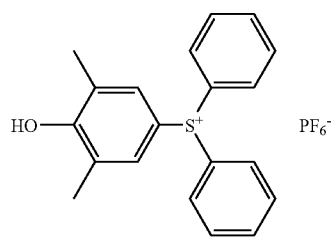 PF$_6^-$
(b-19)
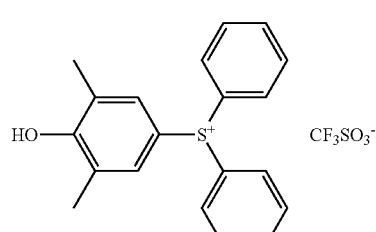 CF$_3$SO$_3^-$
(b-20)
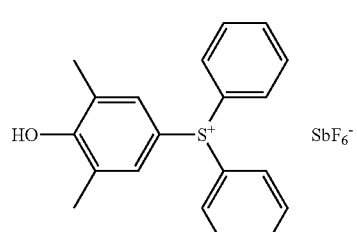 SbF$_6^-$
(b-21)
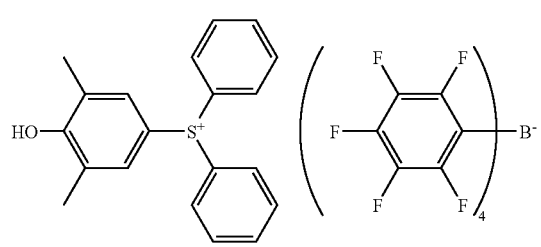
(b-22)
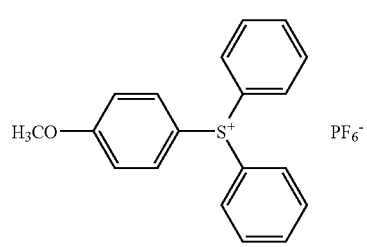 PF$_6^-$
(b-23)
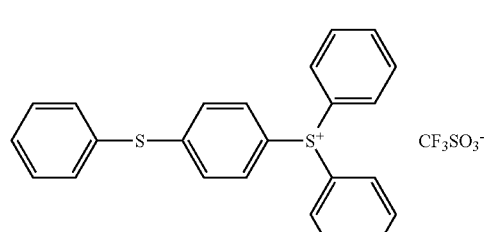 CF$_3$SO$_3^-$
(b-24)
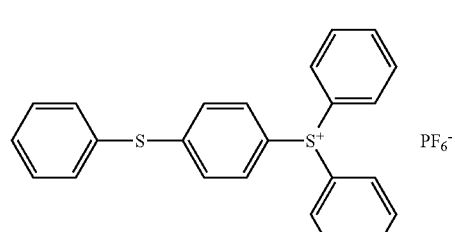 PF$_6^-$
(b-25)
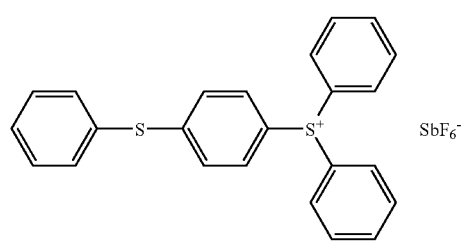 SbF$_6^-$
(b-26)
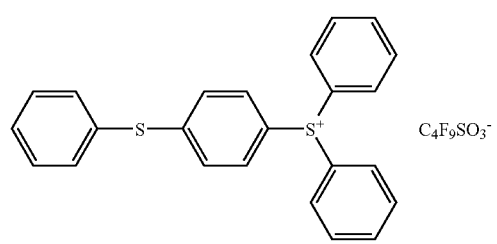 C$_4$F$_9$SO$_3^-$ -continued
(b-27) 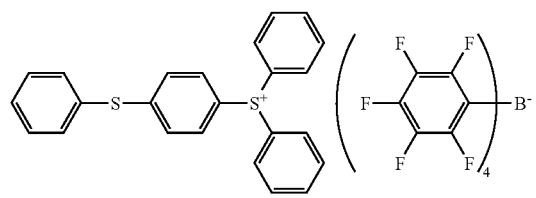
(b-28) 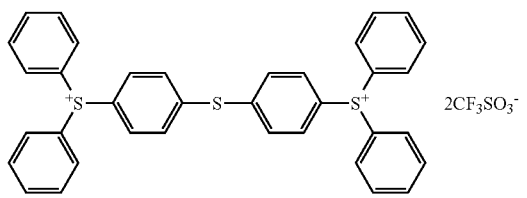 2CF₃SO₃⁻
(b-29) 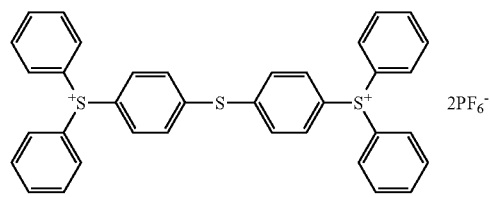 2PF₆⁻
(b-30) 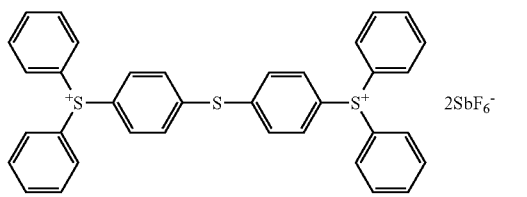 2SbF₆⁻
(b-31) 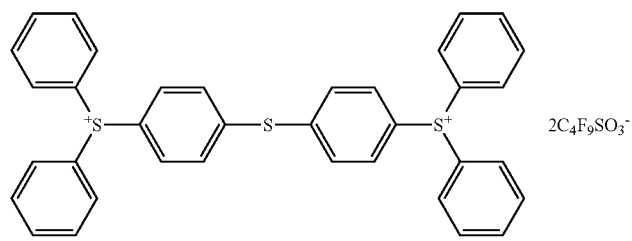 2C₄F₉SO₃⁻
(b-32) 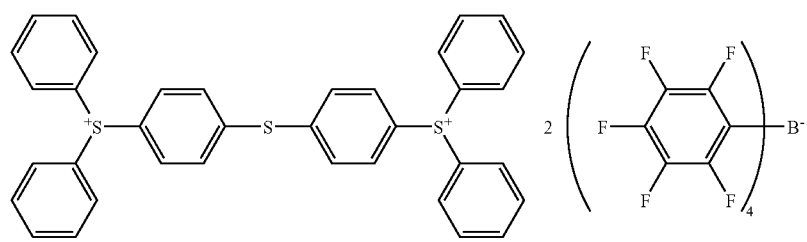
(b-33) 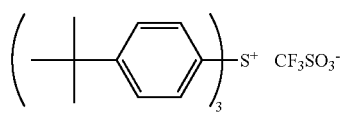 CF₃SO₃⁻
(b-34) 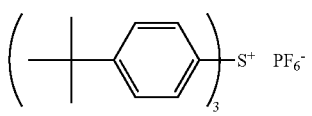 PF₆⁻
(b-35) 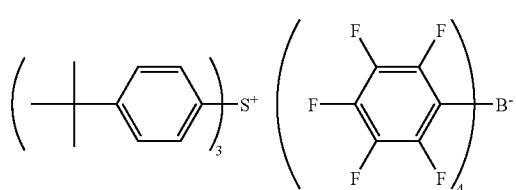
(b-36) 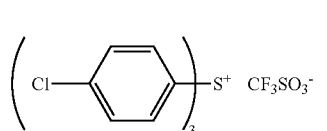 SbF₆⁻
(b-37) 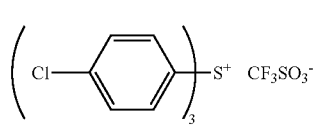 CF₃SO₃⁻
(b-38) 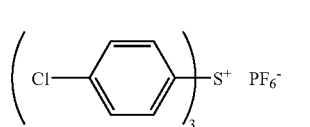 C₄F₉SO₃⁻
(b-39) 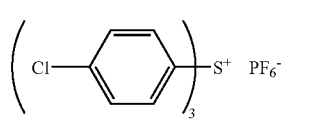 PF₆⁻
(b-40) 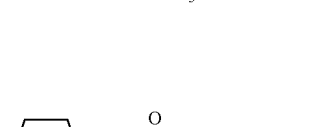
(b-41) 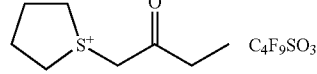 C₄F₉SO₃⁻
(b-42) 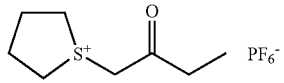 PF₆⁻

(b-43) 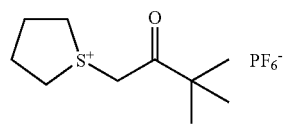
(b-44) 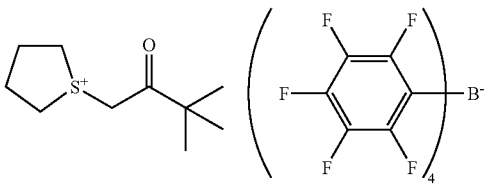
(b-45) 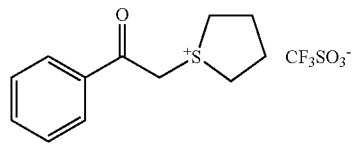
(b-46) 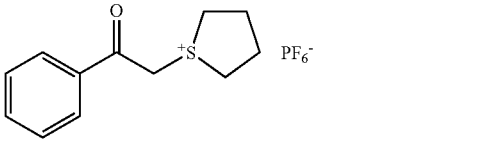
(b-47) 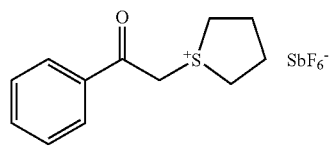
(b-48) 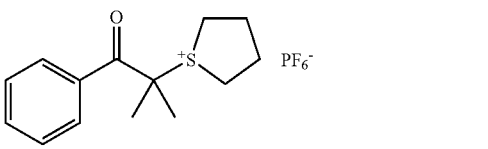
(b-49) 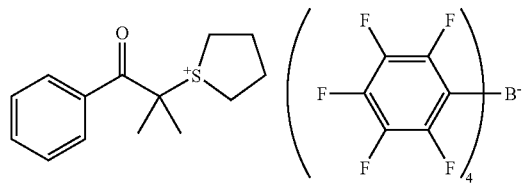
(b-50) 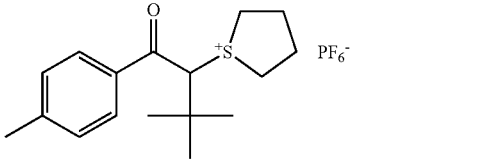
(b-51) 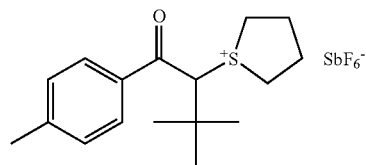
(b-52) 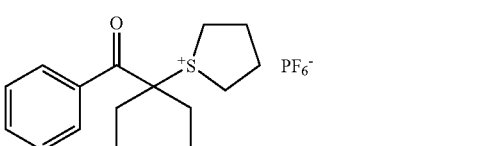
(b-53) 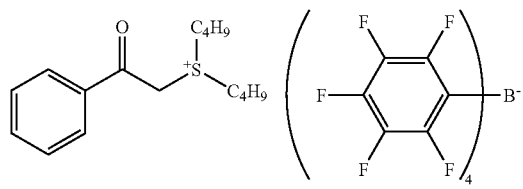
(b-54) 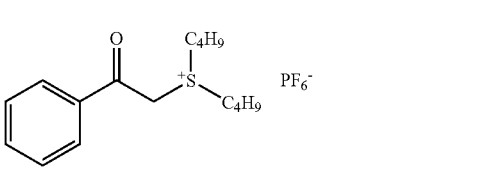
(b-55) 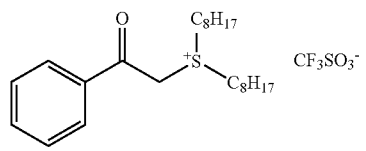
(b-56) 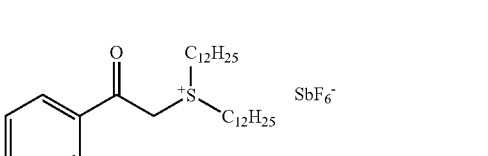
(b-57) 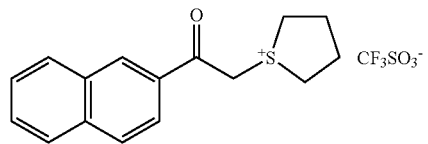
(b-58) 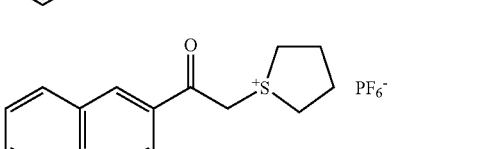
(b-59) 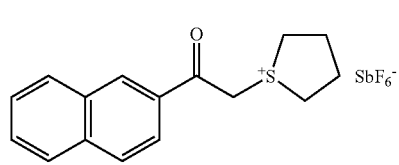
(b-60) 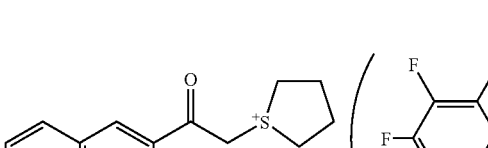

-continued
(b-61) 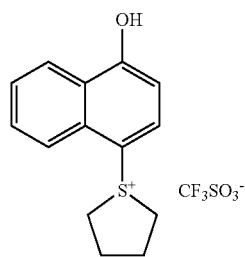
(b-62) 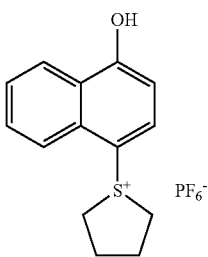
(b-63) 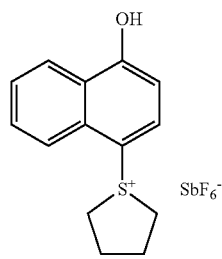
(b-64) 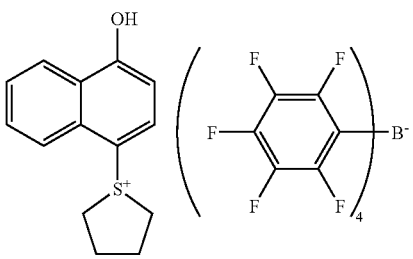
(b-65) 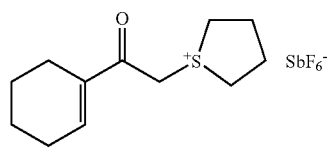
(b-66) 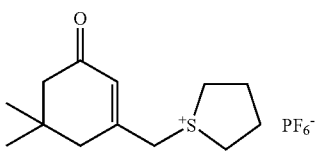
(b-67) 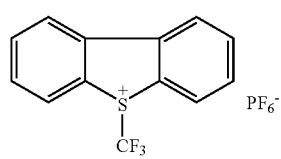
(b-68) 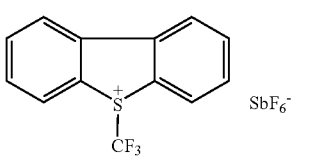
(b-69) 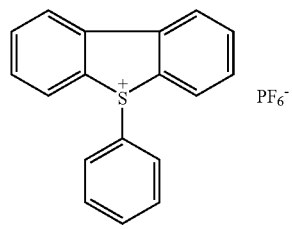
(b-70) 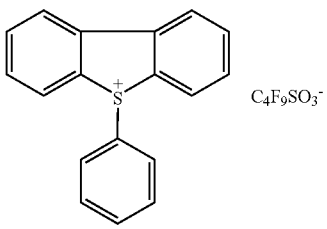
(b-71) 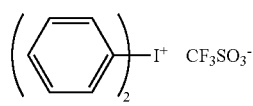
(b-72) 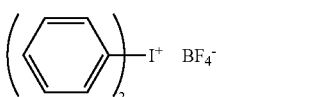
(b-73) 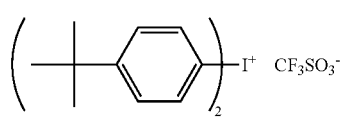
(b-74) 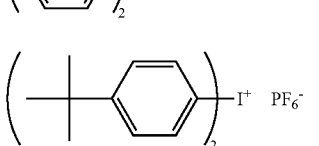
(b-75) 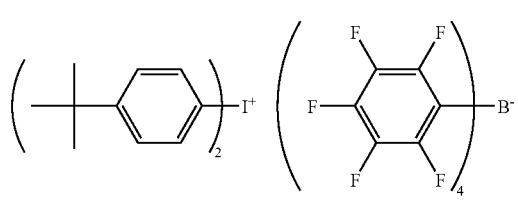
(b-76) 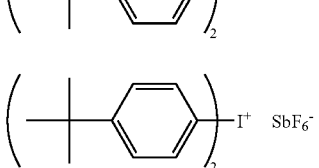
(b-77) 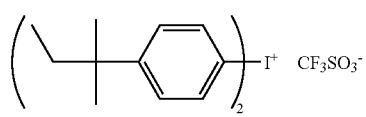
(b-78) 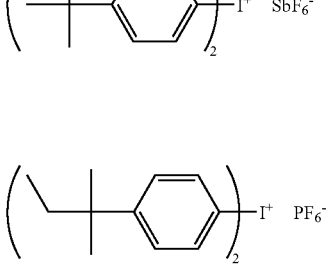

-continued
(b-79) 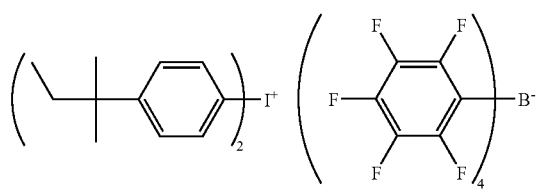
(b-80) 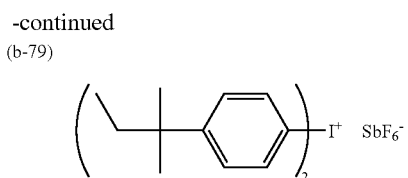
(b-81) 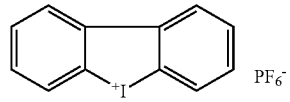
(b-82) 
(b-83) 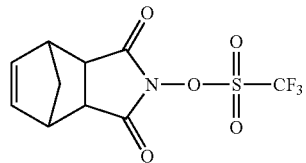
(b-84) 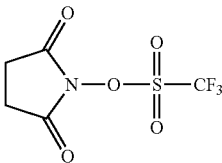
(b-85) 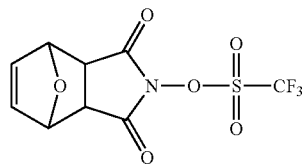
(b-86) 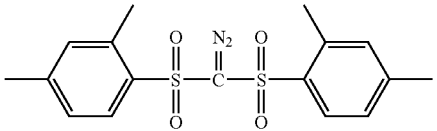
(b-87) 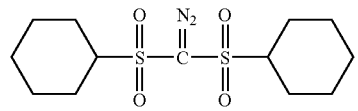
(b-88) 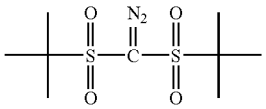
(b-89) 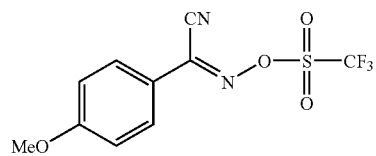
(b-90) 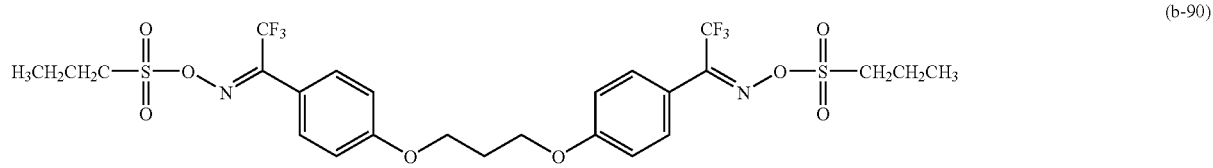
(b-91) 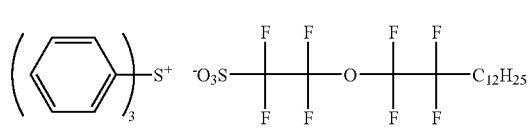
(b-92) 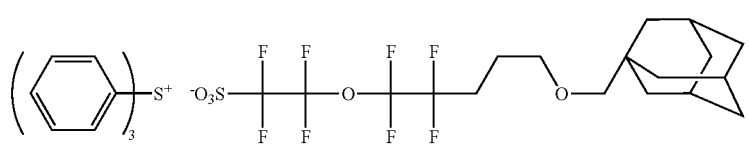
(b-93) 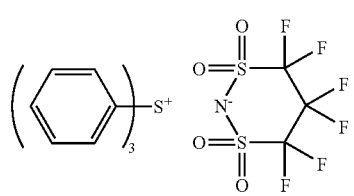
(b-94) 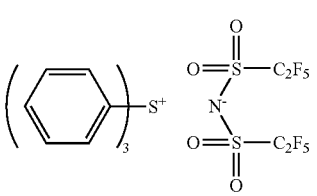

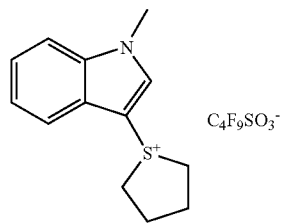

(b-95)

-continued

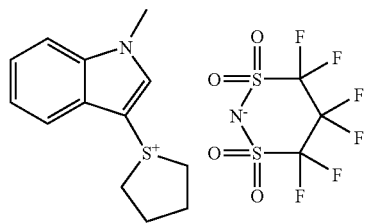

(b-96)

The ink composition or the surface coating composition that can be used in the present invention, the total amount of polymerization initiator used is preferably 0.01 to 35 wt % relative to the total amount of polymerizable monomer, more preferably 0.5 to 20 wt %, and yet more preferably 1.0 to 15 wt %. The composition can be cured with 0.01 wt % or greater of the polymerization initiator, and a cured film having a uniform degree of curing can be obtained with 35 wt % or less.

Furthermore, when a sensitizer, which will be described later, is used in the ink composition or the surface coating composition that can be used in the present invention, the total amount of polymerization initiator used is preferably 200:1 to 1:200 relative to the sensitizer as a ratio by weight of polymerization initiator:sensitizer, more preferably 50:1 to 1:50, and yet more preferably 20:1 to 1:5.

Colorant

The ink composition that can be used in the present invention comprises a colorant.

The colorant that can be used in the present invention is not particularly limited, but a pigment and an oil-soluble dye that have excellent weather resistance and rich color reproduction are preferable, and it may be selected from any known colorant such as a soluble dye. It is preferable that the colorant that can be suitably used in the present invention does not function as a polymerization inhibitor in a polymerization reaction, which is a curing reaction. This is because the sensitivity of the curing reaction by actinic radiation should not be degraded.

Pigment

The pigment that can be used in the present invention is not particularly limited and, for example, organic and inorganic pigments having the numbers below described in the Color Index may be used.

That is, as a red or magenta pigment, Pigment Red 3, 5, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, and Pigment Orange 13, 16, 20, or 36;

as a blue or cyan pigment, Pigment Blue 1, 15, 15:1, 15:2, 15:3, 15:4, 15:6, 16, 17-1, 22, 27, 28, 29, 36, or 60;

as a green pigment, Pigment Green 7, 26, 36, or 50;

as a yellow pigment, Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, or 193;

as a black pigment, Pigment Black 7, 28, or 26;

as a white pigment, Pigment White 6, 18, or 21, etc. may be used according to the intended application.

Oil-soluble Dye

The oil-soluble dye that can be used in the present invention is explained below.

The oil-soluble dye that can be used in the present invention means a dye that is substantially insoluble in water. Specifically, the solubility in water at 25° C. (the mass of dye that can be dissolved in 100 g of water) is no greater than 1 g, preferably no greater than 0.5 g, and more preferably no greater than 0.1 g. Therefore, the oil-soluble dye means a so-called water-insoluble pigment or an oil-soluble dye, and among these the oil-soluble dye is preferable.

Among the oil-soluble dyes that can be used in the present invention, as a yellow dye, any may be used. Examples thereof include aryl or heteryl azo dyes having a coupling component such as a phenol, a naphthol, an aniline, a pyrazolone, a pyridone, or an open-chain active methylene compound; azomethine dyes having a coupling component such as an open-chain active methylene compound; methine dyes such as benzylidene dyes and monomethineoxonol dyes; quinone dyes such as naphthoquinone dyes and anthraquinone dyes; and other dye species such as quinophthalone dyes, nitro/nitroso dyes, acridine dyes, and acridinone dyes.

Among the above-mentioned oil-soluble dyes that can be used in the present invention, as a magenta dye, any may be used. Examples thereof include aryl or heteryl azo dyes having a coupling component such as a phenol, a naphthol, or an aniline; azomethine dyes having a coupling component such as a pyrazolone or a pyrazolotriazole; methine dyes such as arylidene dyes, styryl dyes, merocyanine dyes, and oxonol dyes; carbonium dyes such as diphenylmethane dyes, triphenylmethane dyes, and xanthene dyes; quinone dyes such as naphthoquinones, anthraquinones, or anthrapyridones; and condensed polycyclic dyes such as dioxazine dyes.

Among the oil-soluble dyes that can be used in the present invention, as a cyan dye, any may be used. Examples thereof include indoaniline dyes, indophenol dyes, and azomethine dyes having a coupling component such as a pyrrolotriazole; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl or heteryl azo dyes having a coupling component such as a phenol, a naphthol, or an aniline; and indigo/thioindigo dyes.

The above-mentioned dyes may be dyes that exhibit respective colors of yellow, magenta, and cyan only after a part of the chromophore dissociates, and in that case the counter cation may be an inorganic cation such as an alkali metal or ammonium, may be an organic cation such as pyridinium or a quaternary ammonium salt, or may be a polymer cation having the above cation as a partial structure.

Although not limited to the following, preferred specific examples thereof include CI Solvent Black 3, 7, 27, 29, and 34; CI Solvent Yellow 14, 16, 19, 29, 30, 56, 82, 93, and 162; CI Solvent Red 1, 3, 8, 18, 24, 27, 43, 49, 51, 72, 73, 109, 122, 132, and 218; CI Solvent Violet 3; CI Solvent Blue 2, 11, 25, 35, 38, 67, and 70; CI Solvent Green 3 and 7; and CI Solvent Orange 2.

Particularly preferred examples thereof include Nubian Black PC-0850, Oil Black HBB, Oil Yellow 129, Oil Yellow 105, Oil Pink 312, Oil Red 5B, Oil Scarlet 308, Vali Fast Blue 2606, Oil Blue BOS (manufactured by Orient Chemical Industries, Ltd.), Aizen Spilon Blue GNH (manufactured by Hodogaya Chemical Co., Ltd.), Neopen Yellow 075, Neopen Magenta SE1378, Neopen Blue 808, Neopen Blue FF4012, and Neopen Cyan FF4238 (manufactured by BASF).

In the present invention, the oil-soluble dye may be used singly or in a combination of two or more types.

Furthermore, another colorant such as a water-soluble dye, a disperse dye, or a pigment may be contained as necessary in a range that does not interfere with the effects of the present invention.

In the present invention, a disperse dye may be used in a range that enables it to be dissolved in a water-immiscible organic solvent. Disperse dyes generally include water-soluble dyes, but in the present invention it is preferable for the disperse dye to be used in a range such that it dissolves in a water-immiscible organic solvent. Specific preferred examples of the disperse dye include CI Disperse Yellow 5, 42, 54, 64, 79, 82, 83, 93, 99, 100, 119, 122, 124, 126, 160, 184:1, 186, 198, 199, 201, 204, 224, and 237; CI Disperse Orange 13, 29, 31:1, 33, 49, 54, 55, 66, 73, 118, 119, and 163; CI Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; CI Disperse Violet 33; CI Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and CI Disperse Green 6:1 and 9.

The colorant that can be used in the present invention is preferably added to the ink composition and then dispersed in the ink to an appropriate degree. For dispersion of the colorant, for example, a dispersing machine such as a ball mill, a sand mill, an attritor, a roll mill, an agitator, a Henschel mixer, a colloidal mill, an ultrasonic homogenizer, a pearl mill, a wet type jet mill, or a paint shaker may be used.

The colorant may be added directly to the ink composition of the present invention, but in order to improve dispersibility it may be added in advance to a solvent or a dispersing medium such as a polymerizable monomer used in the present invention.

In the present invention, in order to avoid the problem of the solvent resistance being degraded when the solvent remains in the cured image and the VOC (Volatile Organic Compound) problem of the residual solvent, it is preferable to add the colorant in advance to a dispersing medium such as a polymerizable monomer. As a polymerizable monomer used, it is preferable in terms of dispersion suitability to select a monomer having the lowest viscosity.

These colorants may be used by appropriately selecting one type or two or more types according to the intended purpose of the ink composition.

When a colorant such as a pigment that is present as a solid in the ink composition of is used, it is preferable for the colorant, the dispersant, the dispersing medium, dispersion conditions, and filtration conditions to be set so that the average particle size of colorant particles is preferably 0.005 to 0.5 μm, more preferably 0.01 to 0.45 μm, and yet more preferably 0.015 to 0.4 μm. By such control of particle size, clogging of a head nozzle can be suppressed, and the ink storage stability, the ink transparency, and the curing sensitivity can be maintained.

The content of the colorant in the ink composition is appropriately selected according to the color and the intended purpose, and is generally preferably 0.01 to 30 wt % relative to the weight of the entire ink composition.

Dispersant

It is preferable to add a dispersant when dispersing the colorant. The type of dispersant is not particularly limited, but it is preferable to use a polymeric dispersant. Examples of the polymeric dispersant include polymeric dispersants such as DisperBYK-101, DisperBYK-102, DisperBYK-103, DisperBYK-106, DisperBYK-111, DisperBYK-161, DisperBYK-162, DisperBYK-163, DisperBYK-164, DisperBYK-166, DisperBYK-167, DisperBYK-168, DisperBYK-170, DisperBYK-171, DisperBYK-174, and DisperBYK-182 (all manufactured by BYK Chemie), EFKA4010, EFKA4046, EFKA4080, EFKA5010, EFKA5207, EFKA5244, EFKA6745, EFKA6750, EFKA7414, EFKA7462, EFKA7500, EFKA7570, EFKA7575, and EFKA7580 (all manufactured by EFKA Additives), Disperse Aid 6, Disperse Aid 8, Disperse Aid 15, and Disperse Aid 9100 (manufactured by San Nopco Limited); various types of Solsperse dispersants such as Solsperse 3000, 5000, 9000, 12000, 13240, 13940, 17000, 24000, 26000, 28000, 32000, 36000, 39000, 41000, and 71000 (manufactured by Avecia); Adeka Pluronic L31, F38, L42, L44, L61, L64, F68, L72, P95, F77, P84, F87, P94, L101, P103, F108, L121, and P-123 (manufactured by Adeka Corporation), Isonet S-20 (manufactured by Sanyo Chemical Industries, Ltd.), and Disparlon KS-860, 873SN, and 874 (polymeric dispersant), #2150 (aliphatic poly carboxylic acid), and #7004 (polyether ester type) (manufactured by Kusumoto Chemicals, Ltd.).

It is also possible to use in combination a pigment derivative such as a phthalocyanine derivative (product name: EFKA-745 (manufactured by EFKA)), or Solsperse 5000, 12000, or 22000 (manufactured by Avecia).

The content of the dispersant in the composition is appropriately selected according to the intended purpose, and is generally preferably 0.01 to 5 wt % relative to the weight of the entire ink composition.

Surfactant

It is preferable to add a surfactant to the ink composition or the surface coating composition that can be used in the present invention in order to impart long-term discharge stability.

As the surfactant, those described in JP-A-62-173463 and JP-A-62-183457 can be cited. Examples thereof include anionic surfactants such as dialkylsulfosuccinic acid salts, alkylnaphthalenesulfonic acid salts, and fatty acid salts, nonionic surfactants such as polyoxyethylene alkyl ethers, polyoxyethylene alkyl allyl ethers, acetylene glycols, and polyoxyethylene/polyoxypropylene block copolymers, and cationic surfactants such as alkylamine salts and quaternary ammonium salts. An organofluoro compound may be used as the above-mentioned surfactant. The organofluoro compound is preferably hydrophobic. Examples of the organofluoro compound include fluorine-based surfactants, oil-like fluorine-based compounds (e.g. fluorine oils), solid fluorine compound resins (e.g. tetrafluoroethylene resin), and those described in JP-B-57-9053 (columns 8 to 17) and JP-A-62-135826.

The content of the surfactant in the composition is appropriately selected according to the intended purpose and is generally preferably 0.0001 to 1 wt % relative to the weight of the entirety of the ink composition or the surface coating composition respectively.

Other Component

Furthermore, the ink composition or the surface coating composition may comprise another component as necessary. Examples of the other component include a sensitizer, a cosensitizer, a UV absorber, an antioxidant, an antifading agent, a conductive salt, a solvent, a polymer compound, and a basic compound.

Sensitizer

The ink composition of the present invention may contain a sensitizer in order to promote decomposition of the above-mentioned polymerization initiator by absorbing specific actinic radiation, in particular when used for inkjet recording. The sensitizing dye absorbs specific actinic radiation and attains an electronically excited state. The sensitizer in the electronically excited state causes actions such as electron transfer, energy transfer, or heat generation upon contact with the polymerization initiator. This causes the polymerization initiator to undergo a chemical change and decompose, thus forming a radical, an acid, or a base.

As the sensitizer that can be use in the present invention, it is preferable to use a sensitizing dye.

Preferred examples of the sensitizing dye include those that belong to compounds below and have an adsorption wavelength in the region of 350 nm to 450 nm.

Polynuclear aromatic compounds (e.g. pyrene, perylene, triphenylene), xanthenes (e.g. fluorescein, eosin, erythrosine, rhodamine B, rose bengal), cyanines (e.g. thiacarbocyanine, oxacarbocyanine), merocyanines (e.g. merocyanine, carbomerocyanine), thiazines (e.g. thionine, methylene blue, toluidine blue), acridines (e.g. acridine orange, chloroflavin, acriflavine), anthraquinones (e.g. anthraquinone), squaryliums (e.g. squarylium), and coumarins (e.g. 7-diethylamino-4-methylcoumarin).

Preferred examples of the sensitizing dye include compounds represented by Formulae (IX) to (XIII) below.

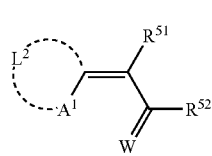

(IX)

In Formula (IX), $A^1$ denotes a sulfur atom or $NR^{50}$, $R^{50}$ denotes an alkyl group or an aryl group, $L^2$ denotes a non-metallic atomic group forming a basic nucleus of a dye in cooperation with a neighboring $A^1$ and the neighboring carbon atom, $R^{51}$ and $R^{52}$ independently denote a hydrogen atom or a monovalent non-metallic atomic group, and $R^{51}$ and $R^{52}$ may be bonded together to form an acidic nucleus of a dye. W denotes an oxygen atom or a sulfur atom.

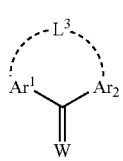

(X)

In Formula (X), $Ar^1$ and $Ar^2$ independently denote an aryl group and are connected to each other via a bond of -$L^3$-. Here, $L^3$ denotes —O— or —S—. W has the same meaning as that shown in Formula (IX).

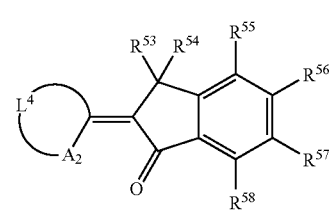

(XI)

In Formula (XI), $A_2$ denotes a sulfur atom or $NR^{59}$, $L^4$ denotes a non-metallic atomic group forming a basic nucleus of a dye in cooperation with the neighboring $A_2$ and carbon atom, $R^{53}$, $R^{54}$, $R^{55}$, $R^{56}$, $R^{57}$, and $R^{58}$ independently denote a monovalent non-metallic atomic group, and $R^{59}$ denotes an alkyl group or an aryl group.

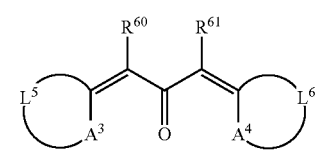

(XII)

In Formula (XII), $A^3$ and $A^4$ independently denote —S—, —$NR^{62}$—, or —$NR^{63}$— $R^{62}$ and $R^{63}$ independently denote a substituted or unsubstituted alkyl group, or a substituted or unsubstituted aryl group, $L^5$ and $L^6$ independently denote a non-metallic atomic group forming a basic nucleus of a dye in cooperation with the neighboring $A^3$ and $A^4$ and neighboring carbon atom, and $R^{60}$ and $R^{61}$ independently denote a hydrogen atom or a monovalent non-metallic atomic group, or are bonded to each other to form an aliphatic or aromatic ring.

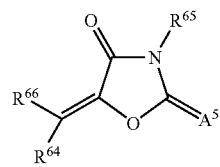

(XIII)

In Formula (XIII), $R^{66}$ denotes an aromatic ring or a hetero ring, which may have a substituent, and $A^5$ denotes an oxygen atom, a sulfur atom, or —$NR^{67}$—. $R^{64}$, $R^{65}$, and $R^{67}$ independently denote a hydrogen atom or a monovalent non-metallic atomic group, and $R^{67}$ and $R^{64}$, and $R^{65}$ and $R^{67}$ may be bonded to each other to form an aliphatic or aromatic ring.

Specific examples of the compounds represented by Formulae (IX) to (XIII) include (E-1) to (E-20) listed below.

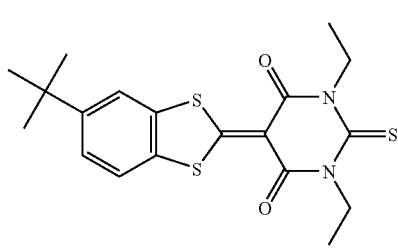

(E-1)

-continued
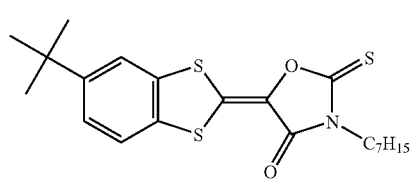
(E-2)
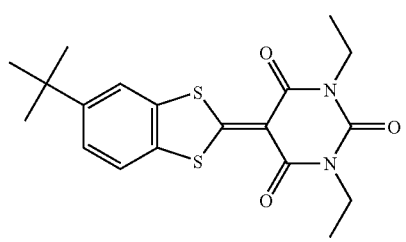
(E-3)
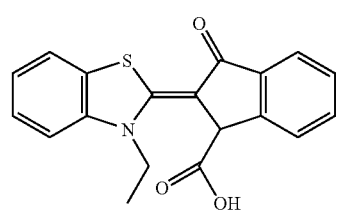
(E-4)
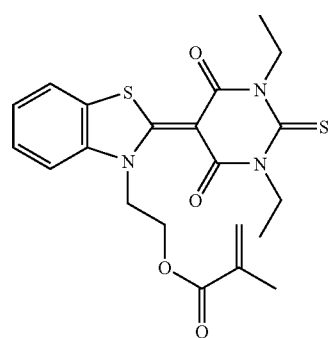
(E-5)
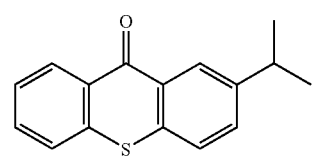
(E-6)
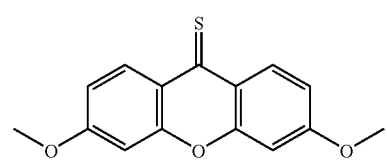
(E-7)
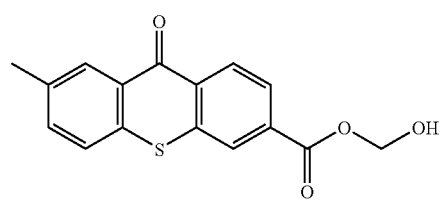
(E-8)
-continued
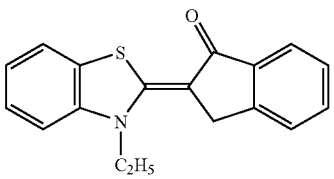
(E-9)
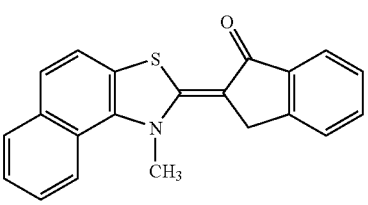
(E-10)
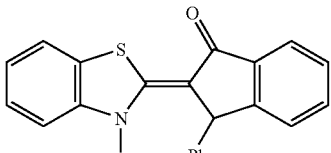
(E-11)
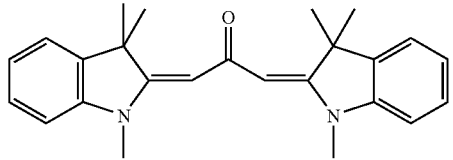
(E-12)
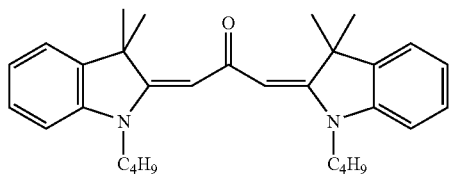
(E-13)
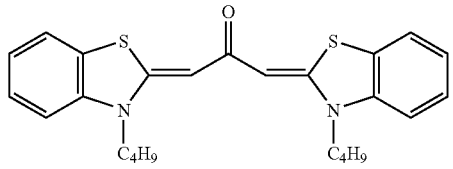
(E-14)
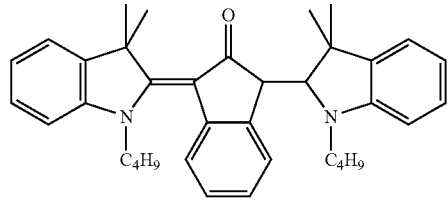
(E-15)
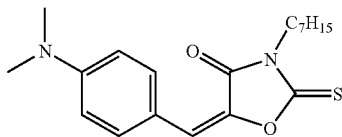
(E-16)

-continued

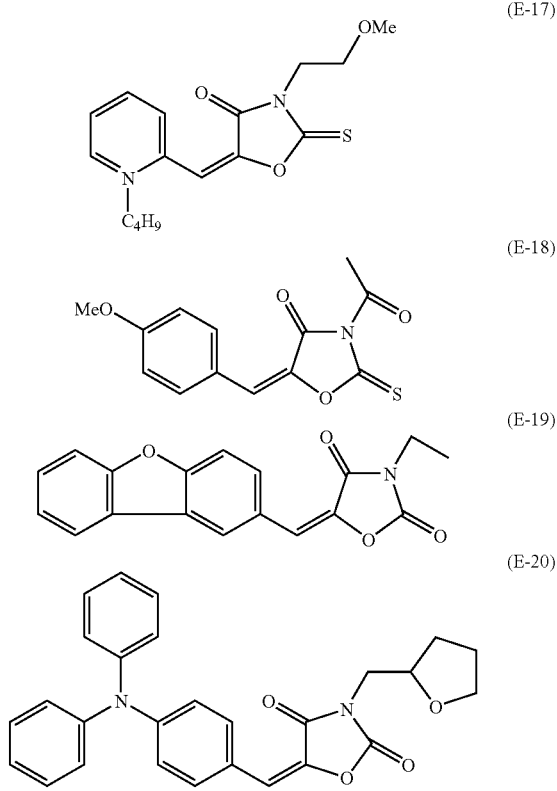

The content of the sensitizing colorant in the ink composition or the surface coating composition of the present invention is appropriately selected according to the intended purpose, but it is preferably 0.05 to 4 wt % relative to the weight of the entirety of the ink composition or the surface coating composition.

Cosensitizer

The composition of the present invention preferably comprises a cosensitizer. In the present invention, the cosensitizer has the function of further improving the sensitivity of the sensitizing dye to actinic radiation or the function of suppressing inhibition by oxygen of polymerization of a polymerizable compound, etc.

Examples of such a cosensitizer include amines such as compounds described in M. R. Sander et al., 'Journal of Polymer Society', Vol. 10, p. 3173 (1972), JP-B-44-20189, JP-A-51-82102, JP-A-52-134692, JP-A-59-138205, JP-A-60-84305, JP-A-62-18537, JP-A-64-33104, and Research Disclosure No. 33825, and specific examples thereof include triethanolamine, ethyl p-dimethylaminobenzoate, p-formyldimethylaniline, and p-methylthiodimethylaniline.

Other examples of the cosensitizer include thiols and sulfides such as thiol compounds described in JP-A-53-702, JP-A-55-500806, and JP-A-5-142772, and disulfide compounds of JP-A-56-75643, and specific examples thereof include 2-mercaptobenzothiazole, 2-mercaptobenzoxazole, 2-mercaptobenzimidazole, 2-mercapto-4(3H)-quinazoline, and β-mercaptonaphthalene.

Yet other examples of the cosensitizer include amino acid compounds (e.g. N-phenylglycine, etc.), organometallic compounds described in JP-B-48-42965 (e.g. tributyltin acetate, etc.), hydrogen-donating compounds described in JP-B-55-34414, sulfur compounds described in JP-A-6-308727 (e.g. trithiane, etc.), phosphorus compounds described in JP-A-6-250387 (diethylphosphite, etc.), and Si—H, Ge—H compounds described in JP-A-8-54735.

The content of the cosensitizer in the composition is appropriately selected according to the intended purpose, but it is preferably 0.05 to 4 wt % relative to the weight of the entire ink composition.

UV Absorber

A UV absorber may be used from the viewpoint of improving the weather resistance of an image obtained and preventing discoloration.

The UV absorbers include benzotriazole compounds described in JP-A-58-185677, JP-A-61-190537, JP-A-2-782, JP-A-5-197075 and JP-A-9-34057; benzophenone compounds described in JP-A-46-2784, JP-A-5-194483 and U.S. Pat. No. 3,214,463; cinnamic acid compounds described in JP-B-48-30492, JP-B-56-21141 and JP-A-10-88106; triazine compounds described in JP-A-4-298503, JP-A-8-53427, JP-A-8-239368, JP-A-10-182621 and JP-W-8-501291 (the term "JP-W" as used herein means an unexamined published international patent application); compounds described in Research Disclosure No. 24239; and compounds represented by stilbene and benzoxazole compounds, which absorb ultraviolet rays to emit fluorescence, the so-called fluorescent brightening agents.

The amount thereof added is appropriately selected according to the intended application, and it is generally on the order of 0.5 to 15 wt % on the basis of the solids content in the composition.

Antioxidant

In order to improve the stability of the composition, an antioxidant may be added. Examples of the antioxidant include those described in Laid-open European Patent Nos. 223739, 309401, 309402, 310551, 310552, and 459-416, Laid-open German Patent No. 3435443, JP-A-54-48535, JP-A-62-262047, JP-A-63-113536, JP-A-63-163351, JP-A-2-262654, JP-A-2-71262, JP-A-3-121449, JP-A-5-61166, JP-A-5-119449, and U.S. Pat. Nos. 4,814,262 and 4,980,275.

The amount thereof added is appropriately selected according to the intended application, and it is preferably on the order of 0.1 to 8 wt % on the basis of the solids content in the composition.

Antifading Agent

The composition that can be used in the present invention may employ various organic and metal complex antifading agents. The organic antifading agents include hydroquinones, alkoxyphenols, dialkoxyphenols, phenols, anilines, amines, indanes, chromans, alkoxyanilines, and heterocycles, and the metal complex antifading agents include nickel complexes and zinc complexes. More specifically, there can be used compounds described in patents cited in Research Disclosure, No. 17643, Items VII-I to J, ibid., No. 15162, ibid., No. 18716, page 650, left-hand column, ibid., No. 36544, page 527, ibid., No. 307105, page 872, and ibid., No. 15162, and compounds contained in general formulae and compound examples of typical compounds described in JP-A-62-215272, pages 127 to 137.

The amount thereof added is appropriately selected according to the intended application, and it is preferably on the order of 0.1 to 8 wt % on the basis of the solids content in the composition.

Conductive Salt

The composition that can be used in the present invention may contain, for the purpose of controlling discharge properties, a conductive salt such as potassium thiocyanate, lithium nitrate, ammonium thiocyanate, or dimethylamine hydrochloride.

Solvent

In order to improve the adhesion to a recording medium, it is also effective to add a trace amount of organic solvent to the composition that can be used in the present invention.

The solvent used in the present invention, when using a resin as an inner construction of polymerization particles, has preferably 2 or greater solubility parameter (SP value) than that of the resin and more preferably 3 or greater.

Examples of the solvent include ketone-based solvents such as acetone, methyl ethyl ketone, and diethyl ketone, alcohol-based solvents such as methanol, ethanol, 2-propanol, 1-propanol, 1-butanol, and tert-butanol, chlorine-based solvents such as chloroform and methylene chloride, aromatic-based solvents such as benzene and toluene, ester-based solvents such as ethyl acetate, butyl acetate, and isopropyl acetate, ether-based solvents such as diethyl ether, tetrahydrofuran, and dioxane, and glycol ether-based solvents such as ethylene glycol monomethyl ether and ethylene glycol dimethyl ether.

In this case, it is effective if the amount thereof added is in a range that does not cause problems with the solvent resistance or the VOC, and the amount is preferably in the range of 0.1 to 5 wt % relative to the total amount of the composition, and more preferably 0.1 to 3 wt %.

High Molecular Weight Compound

The composition that can be used in the present invention may contain various types of high molecular weight compounds in order to adjust film physical properties. Examples of the high molecular weight compounds include acrylic polymers, polyvinylbutyral resins, polyurethane resins, polyamide resins, polyester resins, epoxy resins, phenol resins, polycarbonate resins, polyvinylbutyral resins, polyvinylformal resins, shellac, vinylic resins, acrylic resins, rubber-based resins, waxes, and other natural resins. They may be used in a combination of two or more types. Among these, a vinylic copolymer obtained by copolymerization of an acrylic monomer is preferable. Furthermore, as a copolymer component of the high molecular weight compound, a copolymer containing as a structural unit a 'carboxyl group-containing monomer', an 'alkyl methacrylate ester', or an 'alkyl acrylate ester' may preferably be used.

In addition to the above, the composition may contain as necessary, for example, a leveling additive, a matting agent, a wax for adjusting film physical properties, or a tackifier in order to improve the adhesion to a recording medium such as polyolefin or PET, the tackifier not inhibiting polymerization.

Specific examples of the tackifier include high molecular weight tacky polymers described on pp. 5 and 6 of JP-A-2001-49200 (e.g. a copolymer formed from an ester of (meth) acrylic acid and an alcohol having an alkyl group with 1 to 20 carbons, an ester of (meth)acrylic acid and an alicyclic alcohol having 3 to 14 carbons, or an ester of (meth)acrylic acid and an aromatic alcohol having 6 to 14 carbons), and a low molecular weight tackifying resin having a polymerizable unsaturated bond.

Properties of Ink Composition and Surface Coating Composition

In the present invention, the ink composition and the surface coating composition have a viscosity at 25° C. of no more than 40 mPa·s, preferably 5 to 40 mPa·s, and more preferably 7 to 30 mPa·s. Furthermore, the viscosity of the ink composition and the surface coating composition at the discharge temperature (preferably 25° C. to 80° C., and more preferably 25° C. to 50° C.) are preferably 3 to 15 mPa·s, and more preferably 3 to 13 mPa·s. With regard to the ink composition and surface coating composition that can be used in the present invention, it is preferable that its component ratio is appropriately adjusted so that the viscosity is in the above-mentioned range. When the viscosity at room temperature is set to be high, even when a porous support (recording medium) is used, penetration of the composition into the recording medium can be prevented, and uncured monomer can be reduced. Furthermore, composition spreading when composition droplets have landed can be suppressed, and as a result there is the advantage that the image quality is improved.

The surface tension of the ink composition and the surface coating composition that can be used in the present invention at 25° C. are preferably 20 to 35 mN/m, and yet more preferably 23 to 33 mN/m. When recording is carried out on various types of support (recording medium) such as polyolefin, PET, coated paper, and uncoated paper, from the viewpoint of spread and penetration, it is preferably at least 20 mN/m, and from the viewpoint of wettability it is preferably not more than 35 mN/m.

Support

A support that can be used in the present invention is not particularly limited, and a known recording medium suitable for molding may be used.

Examples of the support include polyolefin-based resins such as polyethylene, polypropylene, polymethylpentene, polybutene, and an olefin-based thermoplastic elastomer, polyester resins such as polyethylene terephthalate, polybutylene terephthalate, polyethylene naphthalate, a terephthalic acid-isophthalic acid-ethylene glycol copolymer, a terephthalic acid-ethylene glycol-1,4-cyclohexanedimethanol copolymer, and a polyester-based thermoplastic elastomer, polyamide resins such as nylon-6, nylon-9, and nylon-66, fluorine-based resins such as polyvinyl fluoride, polyvinylidene fluoride, polyvinylidene trifluoride, an ethylene-ethylene tetrafluoride copolymer, and polyethylene tetrafluoride, an acrylic-based resin, polyvinyl chloride, polystyrene, and a polycarbonate resin.

With regard to the acrylic-based resin, for example, a resin such as polymethyl (meth)acrylate, polyethyl (meth)acrylate, polybutyl (meth)acrylate, a methyl (meth)acrylate-butyl (meth)acrylate copolymer, an ethyl (meth)acrylate-butyl (meth)acrylate copolymer, or a methyl (meth)acrylate-styrene copolymer (the term (meth)acrylate means acrylate or methacrylate) may be used singly or in a combination of two or more types.

In particular, from the viewpoint of molding being easy and various resistance properties of a finished molded printed material being excellent, it is preferable to use polyethylene terephthalate, a polycarbonate resin, or a resin formed by blending a polycarbonate resin with another resin.

Furthermore, in the process for producing a molded printed material of the present invention, a paper support such as art paper, coated paper, or plain paper, or a metal support such as an aluminum plate or a stainless steel plate may suitably be used.

The shape of the support that can be used in the present invention is not particularly limited as long as it is possible to carry out molding, but it is preferably a sheet shape. When a sheet-shaped support is used, although it depends on the material of the support and the molding conditions, the thickness thereof is preferably 50 m to 1,000 μm, more preferably 70 m to 800 μm, and yet more preferably 100 to 500 μm.

Furthermore, the support may be produced by combining a plurality of materials and, for example, when a sheet-shaped support is used, it may be a single layer or a laminate in which two or more layers of different types of resin are laminated.

It is possible to add an appropriate additive to the support as necessary. As the additive, various types of additive may be added in an appropriate amount such that they do not impair surface gloss or thermal behavior such as melting point. Examples thereof include a photostabilizer such as a benzotriazole-based, benzophenone-based, etc. UV absorber or a hindered amine-based radical scavenger, a lubricant such as a silicone resin or a wax, a colorant, a plasticizer, a heat stabilizer, an antimicrobial agent, an anti-mold agent, and an antistatic agent.

Production of Printed Material by Inkjet Method

The process for producing a molded printed material of the present invention comprises (A) a step of forming an image on a support by an inkjet method using an ink composition comprising a polymerizable monomer, a colorant, and a polymerization initiator, (B) a step of forming a surface coating layer on the image by an inkjet method using a liquid composition comprising a polymerizable monomer and a polymerization initiator and comprising substantially no colorant, (C) a step of curing the image by irradiation with actinic radiation, (D) a step of curing the surface coating layer by irradiation with actinic radiation so as to obtain a printed material having the image and the surface coating layer cured on the support, and (E) a step of molding the printed material.

Furthermore, the molded printed material of the present invention is a molded printed material obtained by the process for producing a molded printed material of the present invention.

The inkjet method is a method in which very small droplets of an ink, etc. are discharged with good reproducibility and land in a desired location.

In order to form an image or a surface coating layer using the inkjet method, the inkjet recording system described below may suitably be used.

Inkjet Recording System

The inkjet recording system that can be used in the present invention is not particularly limited, and a known inkjet recording system that can achieve a target resolution may be selected freely and used. That is, any known inkjet recording system, including a commercial product, may carry out discharge of the ink composition and the surface coating composition onto the support or the color image in step (A) and step (B) of the process for producing a molded printed material of the present invention.

Examples of the inkjet recording system that can be used in the present invention include a system comprising an ink supply system, a temperature sensor, and an actinic radiation source.

The ink supply system comprises a main tank containing the ink composition or the surface coating composition, a supply pipe, an ink supply tank immediately before an inkjet head, a filter, and a piezo system inkjet head. The piezo system inkjet head is driven so as to discharge multisize dots of 1 to 100 pL, and preferably 8 to 30 pL, at a resolution of 320×320 to 4000×4000 dpi, more preferably 400×400 to 1600×1600 dpi, and yet more preferably 720×720 dpi. Here, the dpi referred to in the present invention denotes the number of dots per 2.54 cm.

As described above, since it is desirable for the radiation curing type ink such as above mentioned the ink composition and the surface coating composition to be discharged at a constant temperature, a section from the supply tank to the inkjet head is thermally insulated and heated. A method of controlling temperature is not particularly limited, but it is preferable to provide, for example, temperature sensors at a plurality of pipe section positions, and control heating according to the ink flow rate and the temperature of the surroundings. The temperature sensors may be provided on the supply tank and in the vicinity of the inkjet head nozzle.

Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

When the composition is discharged using the above mentioned inkjet recording device, the ink composition and the surface coating composition are preferably discharged after being heated to preferably 25° C. to 80° C., and more preferably 25° C. to 50° C., so as to reduce the viscosity of the ink composition to preferably 3 to 15 mPa·s, and more preferably 3 to 13 mPa·s. In particular, it is preferable to use the ink composition and the surface coating composition having a viscosity at 25° C. of no more than 50 mPa·s since a good discharge stability can be obtained. By employing this method, high discharge stability can be realized.

The radiation curing type of the ink composition and the surface coating composition generally has a viscosity that is higher than that of a normal ink composition or a water-based ink used for an inkjet recording ink, and variation in viscosity due to a change in temperature at the time of discharge is large. Viscosity variation in the ink has a large effect on changes in liquid droplet size and changes in liquid droplet discharge speed and, consequently, causes the image quality to be degraded. It is therefore necessary to maintain the discharge temperature as constant as possible. In the present invention, the control range for the temperature is desirably preferably ±5° C. of a set temperature, more preferably ±2° C. of the set temperature, and yet more preferably ±1° C. of the set temperature.

Step (C) and step (D), that is, steps of curing the discharged ink composition and the discharged surface coating composition by irradiation with actinic radiation so as to cure the ink composition and the surface coating composition are next explained.

In step (C) and step (D) above, the color image and the surface coating layer may be cured individually by irradiation with actinic radiation, or the color image and the surface coating layer may be cured simultaneously.

The ink composition and the surface coating composition discharged on the support or the color image are cured by irradiating them with actinic radiation. In this process, a polymerization initiator contained in the ink composition and the surface coating composition is decomposed by irradiation with actinic radiation so as to generate an initiating species such as a radical, an acid, or a base, and the initiating species functions so as to cause and promote a polymerization reaction of a radically polymerizable compound. When a sensitizer is present together with the polymerization initiator in the ink composition and the surface coating composition, the sensitizer in the system absorbs actinic radiation and becomes excited, and promotes decomposition of the polymerization initiator upon contact with the polymerization initiator, thus achieving a curing reaction with higher sensitivity.

The actinic radiation used in this process may include α rays, γ rays, an electron beam, X rays, UV rays, visible light, and IR rays. Although it depends on the absorption characteristics of the sensitizing dye, the peak wavelength of the actinic radiation is, for example, 200 to 600 nm, preferably 300 to 450 nm, and more preferably 350 to 420 nm.

Furthermore, in the present invention, the polymerization initiation system has sufficient sensitivity for low output actinic radiation. The actinic radiation is applied therefore so that the illumination intensity on the exposed surface is, for example, 10 to 4,000 mW/cm$^2$, and preferably 20 to 2,500 mW/cm$^2$.

As an actinic radiation source, a mercury lamp, a gas/solid laser, etc. are mainly used, and for UV photocuring inkjet a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Furthermore, light-emitting diodes (LED) and laser diodes (LD) may be used as the source of actinic radiation. In particular, when a UV ray source is needed, a UV-LED or a UV-LD may be used. For example, Nichia Corporation has marketed a violet LED having a wavelength of the main emission spectrum of between 365 nm and 420 nm. Furthermore, when a shorter wavelength is needed, U.S. Pat. No. 6,084,250 discloses an LED that can emit actinic radiation whose wavelength is centered between 300 nm and 370 nm. Furthermore, another violet LED is available, and irradiation can be carried out with radiation of a different UV bandwidth. The actinic radiation source particularly preferable in the present invention is a UV-LED, and a UV-LED having a peak wavelength at 350 to 420 nm is particularly preferable.

The maximum illumination intensity of the LED on a recording medium is preferably 10 to 2,000 mW/cm$^2$, more preferably 20 to 1,000 mW/cm$^2$, and particularly preferably 50 to 800 mW/cm$^2$.

The ink composition and the surface coating composition that can be used in the present invention are desirably exposed to such actinic radiation for preferably 0.01 to 120 sec., and more preferably 0.1 to 90 sec.

Irradiation conditions and a basic method for irradiation with actinic radiation are disclosed in JP-A-60-132767. Specifically, a light source is provided on either side of a head unit that includes a composition discharge device, and the head unit and the light source are made to scan by a so-called shuttle system. Irradiation with actinic radiation is carried out after a certain time (preferably 0.01 to 0.5 sec., more preferably 0.01 to 0.3 sec., and yet more preferably 0.01 to 0.15 sec.) has elapsed from when the droplets have landed. By controlling the time from droplets landing to irradiation so as to be a minimum in this way, it becomes possible to prevent the droplets that have landed on a support from spreading before being cured. Furthermore, since the droplets can be exposed before it reaches a deep area of a porous support that the light source cannot reach, it is possible to prevent monomer from remaining unreacted, and as a result the odor can be reduced.

Furthermore, curing may be completed using another light source that is not driven. WO99/54415 discloses, as an irradiation method, a method employing an optical fiber and a method in which a collimated light source is incident on a mirror surface provided on a head unit side face, and a recorded area is irradiated with UV light.

By employing such a method, it is possible to maintain a uniform dot diameter for landed ink even for various types of support having different surface wettability, thereby improving the image quality. In order to obtain a color image, it is preferable to superimpose colors in order from those with a low lightness. By superimposing inks in order from one with low lightness, it is easy for radiation to reach a lower ink, the curing sensitivity is good, the amount of residual monomer decreases, and an improvement in adhesion can be expected. Furthermore, although it is possible to discharge all colors and then expose them at the same time, it is preferable to expose one color at a time from the viewpoint of promoting curing.

In this way, the ink composition and the surface coating composition that can be used in the present invention are cured by irradiation with actinic radiation in high sensitivity to thus form an image on the surface of the support.

Color Image and Surface Coating Layer

The ink composition that can be used in the process for producing a molded printed material of the present invention may be used singly or in a combination of two or more types to thus form a color image.

The ink composition used in the process for producing a molded printed material of the present invention preferably includes a plurality of color ink compositions, and in order to form a full color image it is more preferable for it to include a magenta ink composition, a cyan ink composition, and a yellow ink composition, and it is yet more preferable for it to include a magenta ink composition, a cyan ink composition, a yellow ink composition, a black ink composition, and a white ink composition.

In the process for producing a molded printed material of the present invention, the surface coating layer is formed by discharging an actinic radiation-curing surface coating composition by the inkjet method.

The surface coating layer formed on the color image may be formed on part of the color image or on the entire color image, or the entirety of a printed material may be coated. For example, coating may be carried out specifically on part of an image portion that is in contact with a mold used during molding, on a portion that is highly deformed, or on an entire portion that is in contact with a mold during molding. Two or more surface coating layers may be formed.

Furthermore, the surface coating layer is preferably formed with a halftone dot area of at least 10% of the color image area, and more preferably at least 50%. The halftone dot area referred to here means the sum of the dot areas in a state in which inkjet discharged dots are uniformly dispersed within a surface coated area.

The thickness of the surface coating layer depends on the size of the liquid droplets discharged by inkjet, but is preferably 12 to 36 μm, and more preferably 12 to 24 μm. By increasing the film thickness of a portion having a high level of deformation, it is possible to give a molded printed material having a uniform film thickness and excellent gloss after molding. A larger film thickness of the surface coating layer gives high abrasion resistance, whereas a smaller film thickness gives a cured film with excellent stretchability. It is preferable to appropriately adjust the thickness of the surface coating layer according to the mold shape and the conditions.

Molding of Printed Material

The process for producing a molded printed material of the present invention comprises (E) a step of molding the printed material.

As molding suitably employed in the present invention, embossing, vacuum forming, pressure forming, or vacuum/pressure forming may be employed.

As a system for molding a printed material, a known system may be used, and the system may be integral with the inkjet recording system or separate therefrom.

Embossing

Embossing is a process in which a three-dimensional feel is given by indenting a printed material, etc. in a desired shape such as a pattern or a letter, and may be carried out using a roller, a press, etc.

Examples of embossing include a hot/cold pressing method, and a method described in JP-A-10-199360, etc. may be referred to.

One example of an embossing system employing the hot/cold pressing method is shown below.

In the embossing system, a lower platen and an upper platen are disposed so that they can move toward and away from each other. A plate-shaped heater is fixed on top of the lower platen, and a plate-shaped heater is also fixed to a lower face of the upper platen. This enables a support to be hot pressed while it is heated. In this hot pressing machine, the plate-shaped heater on the lower platen is equipped with a mold having a projection following a predetermined embossing shape, and a mold having a recess that conforms to the shape of the projection is mounted so as to be in contact with the heater fixed to the lower face of the upper platen. A support having an image formed thereon is positioned, a cushion sheet is placed between the support and the mold with the recess, and the support and the cushion sheet are pressed between the upper platen and the lower platen by lowering the upper platen, etc. A pressure applied in this hot pressing step is, for example, 30 tons, and the heating temperature from the plate-shaped heater is, for example, 170° C. The upper platen is pressed against the lower platen, the support and the cushion sheet are sandwiched between the molds, and this hot pressing is maintained for about 3 minutes. The support is heated by the heaters via the molds, and a plurality of projections are formed due to thermal deformation. Subsequently, the support and the cushion sheet sandwiched between the molds are subjected to cold pressing by placing them between internally water-cooled platens without heaters and applying a pressure of, for example, 30 tones by pressing the platens for about 3 minutes. This enables an embossed molded printed material to be obtained in which the support has a projecting shape due to thermal deformation by the hot pressing. The pressure applied and the heating temperature may be adjusted appropriately according to the material of the printed material and conditions such as the shape that is to be formed, etc.

Vacuum Forming, Pressure Forming, and Vacuum/Pressure Forming

Vacuum forming is a method in which a support having an image formed thereon is preheated to a temperature at which it can be thermally deformed, and molding is carried out by pressing it against a mold and cooling while sucking it toward the mold by means of vacuum and stretching it; pressure forming is a method in which a support having an image formed thereon is preheated to a temperature at which it can be thermally deformed, and molding is carried out by pressing it against a mold by applying pressure from the side opposite to the mold and cooling. Vacuum/pressure forming is a method in which molding is carried out by applying a vacuum and pressure at the same time.

With regard to the material of a support for a printed material that is subjected to vacuum forming, pressure forming, or vacuum/pressure forming (hereinafter, also called vacuum forming, etc.), since a high degree of stretchability is required in a heated state, preferred examples thereof include polycarbonate, polyester, cured vinyl chloride, and polystyrene; polycarbonate and polyester are more preferable since molding is easy and various resistance properties of moldings formed by vacuum forming, etc. are excellent, and polycarbonate is most preferable.

Furthermore, the thickness of a support for a printed material subjected to vacuum/pressure forming is preferably 0.01 to 0.8 mm, and more preferably 0.03 to 0.6 mm.

In accordance with the present invention, it is possible to provide a process for producing a molded printed material that can suppress the occurrence of cracks and image dropouts when carrying out molding such as embossing, vacuum, pressure, or vacuum/pressure forming, and a molded printed material obtained by the process for producing a molded printed material.

EXAMPLES

The present invention is explained in further detail by reference to Examples and Comparative Examples. However, the present invention should not be construed as being limited to these Examples.

'Parts' described below means 'parts by weight' unless otherwise specified.

Materials of the radically polymerizable composition used in the present invention are as follows.

IRGALITE BLUE GLVO (cyan pigment, manufactured by Ciba Specialty Chemicals)
CINQUASIA MAGENTA RT-335 D (magenta pigment, manufactured by Ciba Specialty Chemicals)
NOVOPERM YELLOW H2G (yellow pigment, manufactured by Clariant)
SPECIAL BLACK 250 (black pigment, manufactured by Ciba Specialty Chemicals)
Tipaque CR60-2 (white pigment, manufactured by Ishihara Sangyo Kaisha Ltd.)
Fancryl FA-512A (corresponding to compound example M-11, manufactured by Hitachi Chemical Co., Ltd.)
NK ester AMP-10G (phenoxyethyl acrylate, manufactured by Shin-Nakamura Chemical Co., Ltd.)
N-Vinylcaprolactam (NVC, manufactured by ISP)
SR489D (tridecyl acrylate, manufactured by Sartomer Company Inc.)
Actilane 421 (propoxylated neopentyl glycol diacrylate, manufactured by Akcros)
Solsperse 32000 (dispersant, manufactured by Noveon)
Solsperse 36000 (dispersant, manufactured by Noveon)
FIRSTCURE ST-1 (polymerization inhibitor, manufactured by ChemFirst)
Lucirin TPO (photopolymerization initiator, manufactured by BASF)
Benzophenone (photopolymerization initiator, manufactured by Wako Pure Chemical Industries, Ltd.)
IRGACURE 184 (photopolymerization initiator, manufactured by Ciba Specialty Chemicals)
BYK-307 (surfactant, manufactured by BYK Chemie)
FIRSTCURE ITX (sensitizer, manufactured by ChemFirst)

Materials of the cationically polymerizable composition used in the present invention are as follows.

Pigments
IRGALITE BLUE GLVO (cyan pigment, manufactured by Ciba Specialty Chemicals)
CINQUASIA MAGENTA RT-335 D (magenta pigment, manufactured by Ciba Specialty Chemicals)
NOVOPERM YELLOW H2G (yellow pigment, manufactured by Clariant)
SPECIAL BLACK 250 (black pigment, manufactured by Ciba Specialty Chemicals)
Tipaque CR60-2 (white pigment, manufactured by Ishihara Sangyo Kaisha Ltd.)
Dispersants
Solsperse 32000 (manufactured by Noveon)
Solsperse 36000 (manufactured by Noveon)

Monomers
OXT-221 (manufactured by Toagosei Co., Ltd.)

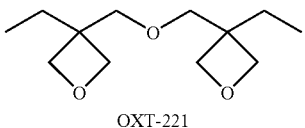

OXT-221

Cyracure UVR-6105 (manufactured by Dow Chemical)

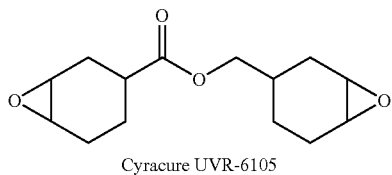 [SMILES: O=C(OCC1CCC2OC2C1)C1CCC2OC2C1]

Cyracure UVR-6105

OXT-211 (manufactured by Toagosei Co., Ltd.)

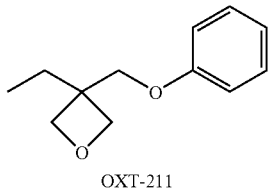

OXT-211

OXT-212 (manufactured by Toagosei Co., Ltd.)

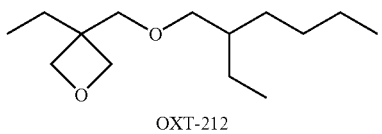 [SMILES: CCCCC(CC)COCC1(CC)COC1]

OXT-212

Polymerization Initiators
CPI-100P (sulfonium salt, manufactured by SAN-APRO Ltd.)

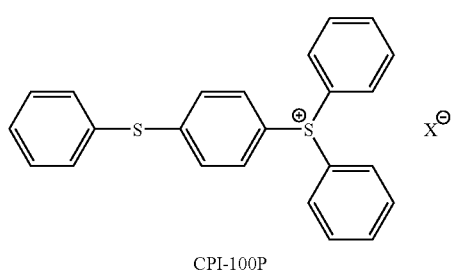

CPI-100P
X = PF$_6$

Dibutoxyanthracene (manufactured by Kawasaki Kasei Chemicals Ltd.)
Surfactant
BYK-307 (manufactured by BYK Chemie)

Mill bases for radically polymerizable compositions were prepared as follows.

Preparation of Cyan Mill Base A 300 parts by weight of IRGALITE BLUE GLVO, 600 parts by weight of Actilane 421, and 100 parts by weight of Solsperse 32000 were mixed by stirring to give a pigment mill base. Preparation of the pigment mill base was carried out by putting it into an M50 disperser motor mill (manufactured by Eiger) and using zirconia beads having a diameter of 0.65 mm at a peripheral speed of 9 m/s for 4 hours.

Preparation of Magenta Mill Base B 300 parts by weight of CINQUASIA MAGENTA RT-335 D, 600 parts by weight of Actilane 421, and 100 parts by weight of Solsperse 32000 were mixed by stirring to give a pigment mill base. Preparation of the pigment mill base was carried out by putting it into an M50 disperser motor mill (manufactured by Eiger) and using zirconia beads having a diameter of 0.65 mm at a peripheral speed of 9 m/s for 10 hours.

Preparation of Yellow Mill Base C 300 parts by weight of NOVOPERM YELLOW H2G, 600 parts by weight of Actilane 421, and 100 parts by weight of Solsperse 32000 were mixed by stirring to give a pigment mill base. Preparation of the pigment mill base was carried out by putting it into an M50 disperser motor mill (manufactured by Eiger) and using zirconia beads having a diameter of 0.65 mm at a peripheral speed of 9 m/s for 10 hours.

Preparation of Black Mill Base D 300 parts by weight of SPECIAL BLACK 250, 600 parts by weight of Actilane 421, and 100 parts by weight of Solsperse 32000 were mixed by stirring to give a pigment mill base. Preparation of the pigment mill base was carried out by putting it into an M50 disperser motor mill (manufactured by Eiger) and using zirconia beads having a diameter of 0.65 mm at a peripheral speed of 9 m/s for 7 hours.

Preparation of White Mill Base E 500 parts by weight of Tipaque CR60-2, 450 parts by weight of NK ester AMP-10G, and 50 parts by weight of Solsperse 36000 were mixed by stirring to give a pigment mill base. Preparation of the pigment mill base was carried out by putting it into an M50 disperser motor mill (manufactured by Eiger) and using zirconia beads having a diameter of 0.65 mm at a peripheral speed of 9 m/s for 4 hours.

Mill bases for cationically polymerizable compositions were prepared as follows.

Preparation of Cyan Mill Base F 300 parts by weight of IRGALITE BLUE GLVO, 600 parts by weight of OXT-212, and 100 parts by weight of Solsperse 32000 were mixed by stirring to give a pigment mill base. Preparation of the pigment mill base was carried out by putting it into an M50 disperser motor mill (manufactured by Eiger) and using zirconia beads having a diameter of 0.65 mm at a peripheral speed of 9 m/s for 3 hours.

Preparation of Magenta Mill Base G 300 parts by weight of CINQUASIA MAGENTA RT-335 D, 600 parts by weight of OXT-212, and 100 parts by weight of Solsperse 32000 were mixed by stirring to give a pigment mill base. Preparation of the pigment mill base was carried out by putting it into an M50 disperser motor mill (manufactured by Eiger) and using zirconia beads having a diameter of 0.65 mm at a peripheral speed of 9 m/s for 8 hours.

Preparation of Yellow Mill Base H 300 parts by weight of NOVOPERM YELLOW H2G, 600 parts by weight of OXT-212, and 100 parts by weight of Solsperse 32000 were mixed by stirring to give a pigment mill base. Preparation of the pigment mill base was carried out by putting it into an M50 disperser motor mill (manufactured by Eiger) and using zirconia beads having a diameter of 0.65 mm at a peripheral speed of 9 m/s for 8 hours.

Preparation of Black Mill Base I 300 parts by weight of SPECIAL BLACK 250, 600 parts by weight of OXT-212, and 100 parts by weight of Solsperse 32000 were mixed by stirring to give a pigment mill base. Preparation of the pigment mill base was carried out by putting it into an M50 disperser motor mill (manufactured by Eiger) and using zirconia beads having a diameter of 0.65 mm at a peripheral speed of 9 m/s for 5.5 hours.

Preparation of White Mill Base J 500 parts by weight of Tipaque CR60-2, 450 parts by weight of OXT-212, and 50 parts by weight of Solsperse 36000 were mixed by stirring to give a pigment mill base. Preparation of the pigment mill base was carried out by putting it into an M50 disperser motor mill (manufactured by Eiger) and using zirconia beads having a diameter of 0.65 mm at a peripheral speed of 9 m/s for 3 hours.

Inkjet Image Recording Method

Subsequently, recording was carried out on a recording medium using an experimental inkjet recording system having two piezo system inkjet nozzles. The ink supply system comprised a main tank, a supply pipe, an ink supply tank immediately before an inkjet head, a filter, and a piezo system inkjet head, and a section from the ink supply tank to the inkjet head was thermally insulated and heated. Temperature sensors were provided on the ink supply tank and in the vicinity of the nozzle of the inkjet head, and the temperature was controlled so that the nozzle section was always at 45° C.±2° C. The piezo system inkjet head was driven so as to discharge multisize dots of 8 to 30 pL at a resolution of 720×720 dpi. The exposure system, the main scanning speed, and the discharge frequency were adjusted so that, after landing, UV light was focused to give an exposure area illumination intensity of 2,100 mW/cm$^2$, and irradiation started 0.1 sec. after the ink landed on the recording medium. The cumulative amount of light applied to an image was adjusted so as to be 6,000 mJ/cm$^2$. The UV lamp employed an HAN250NL high-cure mercury lamp (manufactured by GS Yuasa Corporation). Here, the dpi referred to in the present invention denotes the number of dots per 2.54 cm.

An A4 size solid printed material was printed by the above-mentioned method using each color ink so that the average film thickness of the cured film was 12 μm, and a colorless surface coating layer was formed by exactly the same method over the entire surface of the A4 size color printed image. As a recording medium, HK31-WF (film thickness 120 μm, PET, manufactured by Higashiyama Film Corporation) was used for the embossing test below, and Teflex FT-3 (film thickness 50 μm, PET, manufactured by Teijin DuPont Films Japan Ltd.) was used for a vacuum forming test.

Forming Process Evaluation Method

Embossing Test

Under conditions of 25° C., a printed material thus formed was sandwiched between stainless steel projecting and recessed molds shown in FIG. 1, and a load of 250 kg was applied thereto for 5 sec using a MIZUHO model A hand power press (manufactured by Matsushita Dendo Kogu K.K.), thus carrying out embossing. The embossed area on the image was visually examined for the occurrence of cracks or pinholes.

Vacuum Forming Test

Figure 2:
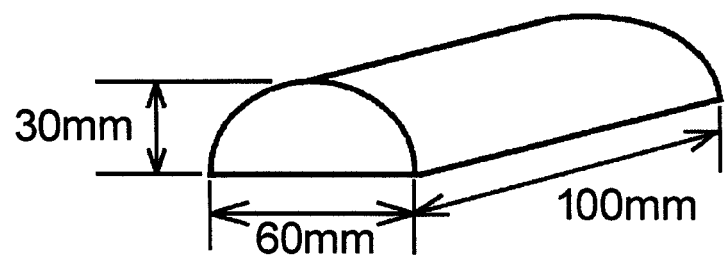
[FIG. 2] A schematic drawing of a mold used in the vacuum forming test.

Vacuum forming was carried out using a Forming 300X vacuum forming system (manufactured by Seiko Sangyo Co., Ltd.). A wooden mold shown in FIG. 2 was placed at the center of a vacuum table of the vacuum forming system, and the temperature of a heater was set so that the temperature of a support became 90° C. After the support temperature reached 90° C., the vacuum table on which the wooden mold was placed was gradually raised by operating a table raise/lower lever, thus carrying out vacuum forming. The molded printed material was visually examined for the occurrence of cracks or pinholes.

Viscosity Measurement Method

Measurement of viscosity in the Examples was carried out using a Brookfield LVDV-I type B viscometer (manufactured by Brookfield) at 25° C. with a rotor rotational speed of 10 to 30 rpm.

Preparation of Ink Composition

Preparation of Radical Ink 1

The components below were stirred using a high-speed water-cooled stirrer to give a cyan UV inkjet ink. The viscosity was 18 mPa·s.

| Cyan ink composition | |
| --- | --- |
| Cyan mill base A | 6.0 parts |
| N-Vinylcaprolactam | 25.0 parts |
| Fancryl FA-512A | 35.4 parts |
| NK ester AMP-10G | 20.0 parts |
| FIRSTCURE ST-1 | 0.05 parts |
| Lucirin TPO | 8.5 parts |
| Benzophenone | 3.0 parts |
| IRGACURE 184 | 2.0 parts |
| BYK-307 | 0.05 parts |

Preparation of Radical Ink 2

The components below were stirred using a high-speed water-cooled stirrer to give a magenta UV inkjet ink. The viscosity was 18 mPa·s.

| Magenta ink composition | |
| --- | --- |
| Magenta mill base B | 12.0 parts |
| N-Vinylcaprolactam | 25.0 parts |
| Fancryl FA-512A | 29.4 parts |
| NK ester AMP-10G | 20.0 parts |
| FIRSTCURE ST-1 | 0.05 parts |
| Lucirin TPO | 8.5 parts |
| Benzophenone | 3.0 parts |
| IRGACURE 184 | 2.0 parts |
| BYK-307 | 0.05 parts |

Preparation of Radical Ink 3

The components below were stirred using a high-speed water-cooled stirrer to give a yellow UV inkjet ink. The viscosity was 18 mPa·s.

| Yellow ink composition | |
| --- | --- |
| Yellow mill base C | 12.0 parts |
| N-Vinylcaprolactam | 25.0 parts |
| Fancryl FA-512A | 29.4 parts |
| NK ester AMP-10G | 20.0 parts |
| FIRSTCURE ST-1 | 0.05 parts |
| Lucirin TPO | 8.5 parts |
| Benzophenone | 3.0 parts |
| IRGACURE 184 | 2.0 parts |
| BYK-307 | 0.05 parts |

Preparation of Radical Ink 4

The components below were stirred using a high-speed water-cooled stirrer to give a black UV inkjet ink. The viscosity was 22 mPa·s.

| Black ink composition | |
|---|---|
| Black mill base D | 6.0 parts |
| N-Vinylcaprolactam | 30.0 parts |
| Fancryl FA-512A | 50.4 parts |
| FIRSTCURE ST-1 | 0.05 parts |
| Lucirin TPO | 8.5 parts |
| Benzophenone | 3.0 parts |
| IRGACURE 184 | 2.0 parts |
| BYK-307 | 0.05 parts |

Preparation of Radical Ink 5

The components below were stirred using a high-speed water-cooled stirrer to give a white UV inkjet ink. The viscosity was 24 mPa·s.

| White ink composition | |
|---|---|
| White mill base E | 31.0 parts |
| N-Vinylcaprolactam | 18.0 parts |
| Fancryl FA-512A | 26.4 parts |
| NK ester AMP-10G | 10.0 parts |
| FIRSTCURE ST-1 | 0.05 parts |
| Lucirin TPO | 8.5 parts |
| Benzophenone | 3.0 parts |
| IRGACURE 184 | 2.0 parts |
| BYK-307 | 0.05 parts |
| FIRSTCURE ITX | 1.0 part |

Preparation of Radical Ink 6

The components below were stirred using a high-speed water-cooled stirrer to give a cyan UV inkjet ink. The viscosity was 14 mPa·s.

| Cyan ink composition | |
|---|---|
| Cyan mill base A | 6.0 parts |
| N-Vinylcaprolactam | 25.0 parts |
| SR489D | 55.4 parts |
| FIRSTCURE ST-1 | 0.05 parts |
| Lucirin TPO | 8.5 parts |
| Benzophenone | 3.0 parts |
| IRGACURE 184 | 2.0 parts |
| BYK-307 | 0.05 parts |

Preparation of Cationic Ink 1

The components below were stirred using a high-speed water-cooled stirrer to give a cyan UV inkjet ink. The viscosity was 30 mPa·s.

| Cyan ink composition | |
|---|---|
| Cyan mill base F | 6.0 parts |
| OXT-221 | 11.0 parts |
| UVR-6105 | 9.9 parts |
| OXT-211 | 60.0 parts |
| CPI-100P | 12.0 parts |
| Dibutoxyanthracene | 1.0 part |
| BYK-307 | 0.1 parts |

Preparation of Cationic Ink 2

The components below were stirred using a high-speed water-cooled stirrer to give a magenta UV inkjet ink. The viscosity was 33 mPa·s.

| Magenta ink composition | |
|---|---|
| Magenta mill base G | 12.0 parts |
| OXT-221 | 11.0 parts |
| UVR-6105 | 11.9 parts |
| OXT-211 | 52.0 parts |
| CPI-100P | 12.0 parts |
| Dibutoxyanthracene | 1.0 part |
| BYK-307 | 0.1 parts |

Preparation of Cationic Ink 3

The components below were stirred using a high-speed water-cooled stirrer to give a yellow UV inkjet ink. The viscosity was 34 mPa·s.

| Yellow ink composition | |
|---|---|
| Yellow mill base H | 12.0 parts |
| OXT-221 | 11.0 parts |
| UVR-6105 | 11.9 parts |
| OXT-211 | 52.0 parts |
| CPI-100P | 12.0 parts |
| Dibutoxyanthracene | 1.0 part |
| BYK-307 | 0.1 parts |

Preparation of Cationic Ink 4

The components below were stirred using a high-speed water-cooled stirrer to give a black UV inkjet ink. The viscosity was 31 mPa·s.

| Black ink composition | |
|---|---|
| Black mill base I | 6.0 parts |
| OXT-221 | 11.0 parts |
| UVR-6105 | 9.9 parts |
| OXT-211 | 60.0 parts |
| CPI-100P | 12.0 parts |
| Dibutoxyanthracene | 1.0 part |
| BYK-307 | 0.1 parts |

Preparation of Cationic Ink 5

The components below were stirred using a high-speed water-cooled stirrer to give a white UV inkjet ink. The viscosity was 36 mPa·s.

| White ink composition | |
|---|---|
| White mill base J | 30.0 parts |
| OXT-221 | 10.0 parts |
| UVR-6105 | 8.9 parts |
| OXT-211 | 40.0 parts |
| CPI-100P | 10.0 parts |
| Dibutoxyanthracene | 1.0 part |
| BYK-307 | 0.1 parts |

Evaluation of Inks

Inkjet recording was carried out using the ink compositions thus obtained. The embossing test and the vacuum forming test were carried out using the images thus obtained. The results are given in Table 1.

Preparation of Cationic Ink 6

The components below were stirred using a high-speed water-cooled stirrer to give a cyan UV inkjet ink. The viscosity was 30 mPa·s.

| Cyan ink composition | |
|---|---|
| Cyan mill base F | 6.0 parts |
| OXT-221 | 11.0 parts |
| UVR-6105 | 9.9 parts |
| OXT-212 | 60.0 parts |
| CPI-100P | 12.0 parts |
| Dibutoxyanthracene | 1.0 part |
| BYK-307 | 0.1 parts |

Preparation of Surface Coating Composition
Preparation of Radical Ink 7

The components below were stirred using a high-speed water-cooled stirrer to give a UV inkjet ink. The viscosity was 18 mPa·s.

| N-Vinylcaprolactam | 25.0 parts |
|---|---|
| Fancryl FA-512A | 41.4 parts |

Preparation of Cationic Ink 7

The components below were stirred using a high-speed water-cooled stirrer to give a UV inkjet ink. The viscosity was 30 mPa·s.

| OXT-221 | 9.0 parts |
|---|---|
| UVR-6105 | 9.9 parts |
| OXT-211 | 68.0 parts |
| CPI-100P | 12.0 parts |
| Dibutoxyanthracene | 1.0 part |
| BYK-307 | 0.1 parts |

Example 1

Printed materials were formed by the inkjet image recording method above using the inks and surface coating compositions so prepared and subjected to the embossing test and the vacuum forming test. The results are summarized in Table 1.

TABLE 1

| | Color image Ink composition | | | | Surface coating layer Surface coating composition | | | Molding test | |
|---|---|---|---|---|---|---|---|---|---|
| | Color | Ink No. | Image area | Image film thickness | Ink No. | Image area | Image film thickness | Embossing test | Vacuum forming test |
| Ex. 1 | Cyan | Radical ink 1 | Solid | 12 μm | Radical ink 7 | Solid | 12 μm | Good | Good |
| Ex. 2 | Magenta | Radical ink 2 | Solid | 12 μm | Radical ink 7 | Solid | 12 μm | Good | Good |
| Ex. 3 | Yellow | Radical ink 3 | Solid | 12 μm | Radical ink 7 | Solid | 12 μm | Good | Good |
| Ex. 4 | Black | Radical ink 4 | Solid | 12 μm | Radical ink 7 | Solid | 12 μm | Good | Good |
| Ex. 5 | White | Radical ink 5 | Solid | 12 μm | Radical ink 7 | Solid | 12 μm | Good | Good |
| Ex. 6 | Cyan | Radical ink 6 | Solid | 12 μm | Radical ink 7 | Solid | 12 μm | Good | Good |
| Ex. 7 | Cyan | Radical ink 1 | Solid | 12 μm | Cationic ink 7 | Solid | 12 μm | Good | Good |
| Ex. 8 | Cyan | Radical ink 2 | Solid | 12 μm | Radical ink 7 | 50% halftone | — | Good | Good |
| Ex. 9 | Cyan | Cationic ink 1 | Solid | 12 μm | Cationic ink 7 | Solid | 12 μm | Good | Good |
| Ex. 10 | Magenta | Cationic ink 2 | Solid | 12 μm | Cationic ink 7 | Solid | 12 μm | Good | Good |
| Ex. 11 | Yellow | Cationic ink 3 | Solid | 12 μm | Cationic ink 7 | Solid | 12 μm | Good | Good |
| Ex. 12 | Black | Cationic ink 4 | Solid | 12 μm | Cationic ink 7 | Solid | 12 μm | Good | Good |
| Ex. 13 | White | Cationic ink 5 | Solid | 12 μm | Cationic ink 7 | Solid | 12 μm | Good | Good |
| Ex. 14 | Cyan | Cationic ink 6 | Solid | 12 μm | Cationic ink 7 | Solid | 12 μm | Good | Good |
| Ex. 15 | Cyan | Cationic ink 1 | Solid | 12 μm | Radical ink 7 | Solid | 12 μm | Good | Good |
| Ex. 16 | Cyan | Cationic ink 1 | Solid | 12 μm | Cationic ink 7 | 50% halftone | — | Good | Good |
| Comp. Ex. 1 | Cyan | Radical ink 6 | Solid | 12 μm | Without surface coating layer | | | Part of image transferred to mold, pinholes in printed material. | After molding, cracks were observed in part of printed material. When handling printed material, a large number of scratches were formed on the surface of the printed material due to abrasion, etc. |
| Comp. Ex. 2 | Cyan | Cationic ink 6 | Solid | 12 μm | Without surface coating layer | | | Part of image transferred to mold, pinholes in printed material. | After molding, cracks were observed in part of printed material. When handling printed material, a large number of scratches were formed on the surface of the printed material due to abrasion, etc. |

Good: no pinholes formed in printed product

-continued

| NK ester AMP-10G | 20.0 parts |
|---|---|
| FIRSTCURE ST-1 | 0.05 parts |
| Lucirin TPO | 8.5 parts |
| Benzophenone | 3.0 parts |
| IRGACURE | 2.0 parts |
| BYK-307 | 0.05 parts |

What is claimed is:

1. A process for producing a molded printed material comprising:
   (A) a step of forming an image on a support by an inkjet method using an inkjet ink composition comprising a monofunctional radically polymerizable monomer, a colorant, and a polymerization initiator;
   (B) a step of forming a surface coating layer on the image by an inkjet method using an inkjet liquid composition comprising (1) at least one acrylate having a cyclic structure, and (2) a polymerization initiator, and comprising no colorant;
(C) a step of curing the image by irradiation with actinic radiation;
(D) a step of curing the surface coating layer by irradiation with actinic radiation so as to obtain a printed material having the image and the surface coating layer cured on the support; and
(E) a step of molding the printed material,
wherein the inkjet ink composition and the inkjet liquid composition are both radically polymerizable compositions,
the radically polymerizable composition comprises a monofunctional radically polymerizable monomer containing only one ethylenically unsaturated double bond group selected from the group consisting of an acrylate group, a methacrylate group, an acrylamide group, a methacrylamide group, and an N-vinyl group,
the content of the monofunctional radically polymerizable monomer in the radically polymerizable composition is at least 65 wt %,
the inkjet ink composition comprises N-vinylcaprolactam as the monofunctional radically polymerizable monomer,
the molding is embossing, vacuum forming, pressure forming, or vacuum/pressure forming, and
both the inkjet ink composition and the inkjet liquid composition have a viscosity at 25° C. of no more than 50 mPa·s.

2. The process for producing a molded printed material according to claim 1, wherein the radically polymerizable compositions comprise a monofunctional radically polymerizable monomer containing only one ethylenically unsaturated double bond group selected from the group consisting of an acrylate group, a methacrylate group, an acrylamide group, a methacrylamide group, and an N-vinyl group.

3. The process for producing a molded printed material according to claim 2, wherein the content of the monofunctional radically polymerizable monomer in the inkjet ink composition or the inkjet liquid composition is at least 65 wt %.

4. The process for producing a molded printed material according to claim 1, wherein the radically polymerizable composition comprises a cyclic group-containing (meth) acrylate.

5. The process for producing a molded printed material according to claim 1, wherein the surface coating layer has a thickness of 12 to 36 μm.

6. The process for producing a molded printed material according to claim 1, wherein the support is polyethylene terephthalate, a polycarbonate resin, or a resin formed by blending a polycarbonate resin with another resin.

7. The process for producing a molded printed material to according claim 1, wherein the molding is embossing.

8. A molded printed material obtained by the process for producing a molded printed material according to claim 1.

* * * * *